United States Patent
Yu et al.

(10) Patent No.: US 11,642,825 B2
(45) Date of Patent: May 9, 2023

(54) POLYESTER FILM AND PREPERATION METHOD THEREOF

(71) Applicant: SKC CO., LTD., Gyeonggi-do (KR)

(72) Inventors: A Rim Yu, Gyeonggi-do (KR); Gun Uk Kim, Gyeonggi-do (KR); Sechul Lee, Gyeonggi-do (KR); Sun Ki Lee, Gyeonggi-do (KR); Sang Min Choi, Gyeonggi-do (KR); Jin-Seok Park, Gyeonggi-do (KR); Jung Won Yu, Gyeonggi-do (KR)

(73) Assignee: SKC CO., LTD., Gyeonggi-do (KR)

( * ) Notice: Subject to any disclaimer, the term of this patent is extended or adjusted under 35 U.S.C. 154(b) by 0 days.

(21) Appl. No.: 17/544,588

(22) Filed: Dec. 7, 2021

(65) Prior Publication Data

US 2022/0176605 A1    Jun. 9, 2022

(30) Foreign Application Priority Data

Dec. 7, 2020    (KR) .......................... 10-2020-0169508
Dec. 9, 2020    (KR) .......................... 10-2020-0171208
(Continued)

(51) Int. Cl.
    *B29C 48/00*    (2019.01)
    *B29C 48/08*    (2019.01)
    (Continued)

(52) U.S. Cl.
    CPC .......... *B29C 48/0018* (2019.02); *B05D 7/536* (2013.01); *B29C 48/022* (2019.02);
    (Continued)

(58) Field of Classification Search
    CPC ... B29C 48/0018; B29C 48/022; B29C 48/08; B05D 7/536; B29K 2067/00;
    (Continued)

(56) References Cited

U.S. PATENT DOCUMENTS 6,517,762 B1    2/2003    Tsunekawa et al.
2009/0123767 A1*    5/2009    Gohil .................... B32B 27/285
                                                         428/458
(Continued)

FOREIGN PATENT DOCUMENTS

CN    111909403 A    11/2020
CN    111909404 A    11/2020
(Continued)

OTHER PUBLICATIONS

Office Action issued by the Korean Patent Office for Application No. 10-2020-0169508 dated May 24, 2021.
(Continued)

*Primary Examiner* — Nathan L Van Sell
(74) *Attorney, Agent, or Firm* — IP & T Group LLP

(57) ABSTRACT

A polyester-based film having excellent scratch resistance, durability, transparency, and visibility and a process for preparing the same. The polyester-based film comprises a base layer and a coating layer on at least one side of the base layer. The light passage according to Relationship 1 is 91% or more, or the total transmittance for light of 380 nm to 780 nm is 92% or more, it has excellent optical properties, durability, visibility, and reliability. Thus, it can be applied to display devices such as smartphones, tablet PCs, and laptops. In addition, in the polyester-based film according to an embodiment, the strain with respect to tensile load satisfies a specific range, whereby it is possible to achieve the flexibility that hardly causes deformation even when a certain load is maintained for a long period of time. Thus, it can be applied to flexible display devices, particularly, foldable display devices.

6 Claims, 8 Drawing Sheets

US 11,642,825 B2
Page 2

(30) Foreign Application Priority Data

| Dec. 9, 2020 | (KR) | 10-2020-0171223 |
| Jul. 23, 2021 | (KR) | 10-2021-0097041 |
| Jul. 23, 2021 | (KR) | 10-2021-0097042 |

(51) Int. Cl.
  *B05D 7/00* (2006.01)
  *B29K 67/00* (2006.01)
  *B29L 7/00* (2006.01)
  *B29L 31/34* (2006.01)

(52) U.S. Cl.
  CPC .......... *B29C 48/08* (2019.02); *B29K 2067/00* (2013.01); *B29K 2995/005* (2013.01); *B29K 2995/0026* (2013.01); *B29K 2995/0046* (2013.01); *B29K 2995/0077* (2013.01); *B29L 2007/00* (2013.01); *B29L 2031/3475* (2013.01)

(58) Field of Classification Search
  CPC .... B29K 2995/0026; B29K 2995/0046; B29K 2995/005; B29K 2995/0077; B29L 2007/00; B29L 2031/3475
  See application file for complete search history.

(56) References Cited

U.S. PATENT DOCUMENTS

| 2015/0353760 A1 | 12/2015 | Bae et al. |
| 2020/0342200 A1 | 10/2020 | Furuta et al. |
| 2020/0353733 A1 | 11/2020 | Kim et al. |
| 2020/0353734 A1 | 11/2020 | Kim et al. |

FOREIGN PATENT DOCUMENTS

| JP | H11-254524 A | 9/1999 | |
| JP | 2018-059078 A | 4/2018 | |
| JP | 2018-124367 A | 8/2018 | |
| KR | 10-2014-0104175 A | 8/2014 | |
| KR | 10-2016-0117152 A | 10/2016 | |
| KR | 10-2019-0003441 A | 1/2019 | |
| KR | 10-2052843 B1 | 12/2019 | |
| KR | 10-2020-0125466 A | 11/2020 | |
| WO | 2018/159285 A1 | 9/2018 | |
| WO | WO-2018159285 A1 * | 9/2018 | ............. B32B 27/30 |

OTHER PUBLICATIONS

Office Action issued by the Korean Patent Office for Application No. 10-2020-0171208 dated May 24, 2021.

Office Action issued by the Korean Patent Office for Application No. 10-2020-0171223 dated May 24, 2021.

Office Action issued by the Japanese Patent Office dated Jan. 4, 2022.

Office Action issued by the Korean Intellectual Property Office dated May 3, 2022.

Office Action for Chinese Patent Application No. 202111512134.8 issued by the Chinese Patent Office dated Aug. 2, 2022.

* cited by examiner

[Fig. 1]
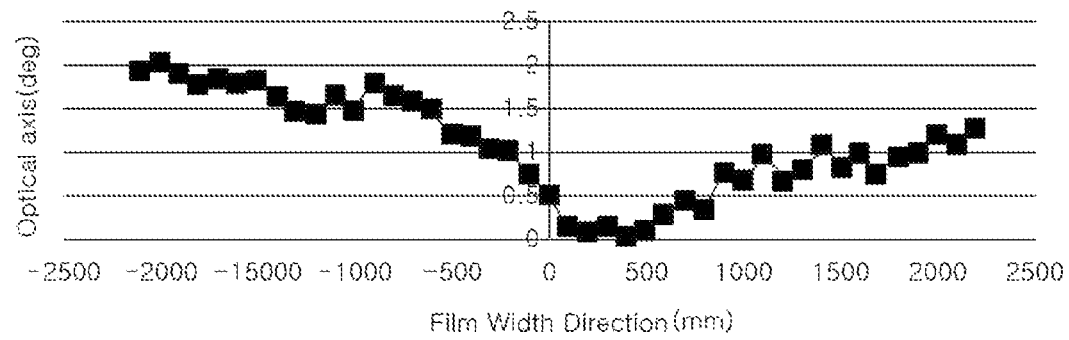
[Fig. 2]
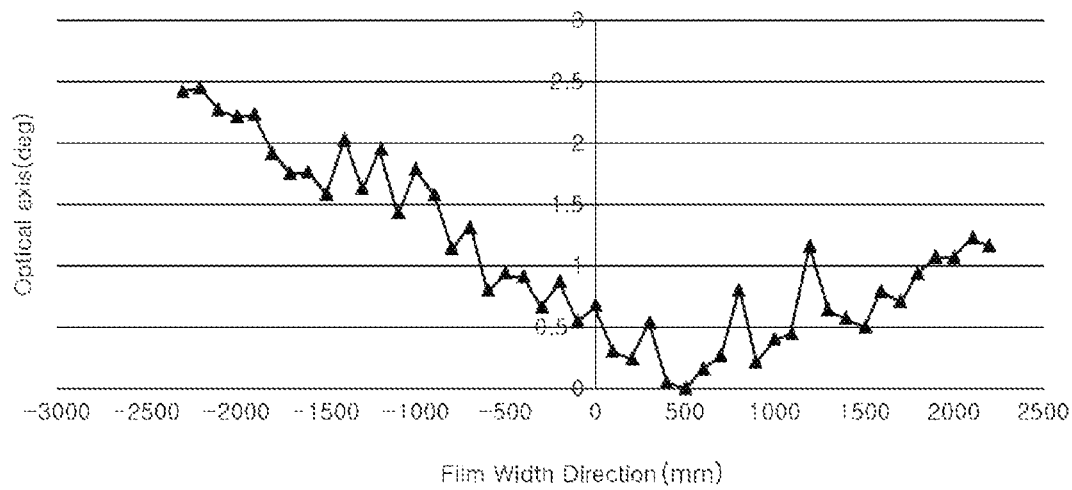

[Fig. 3]
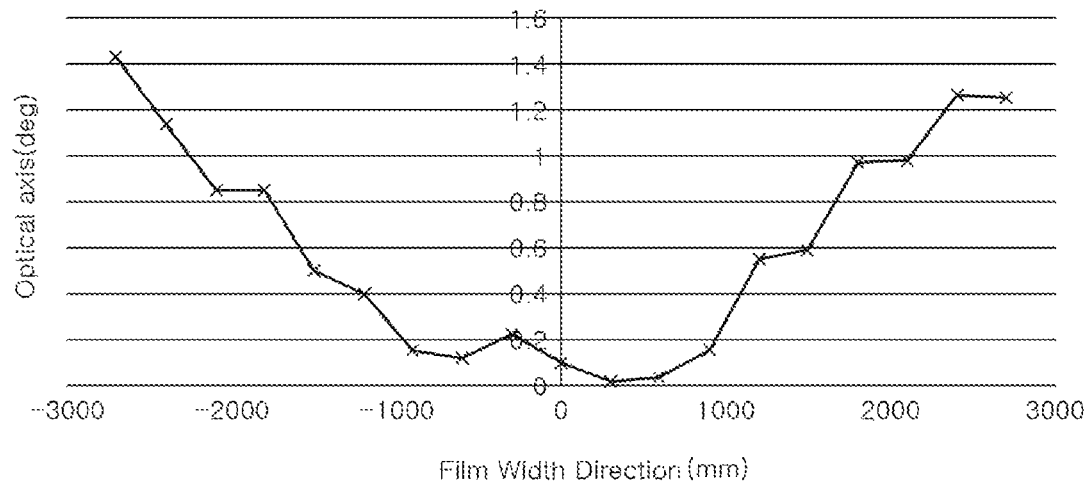
[Fig. 4]
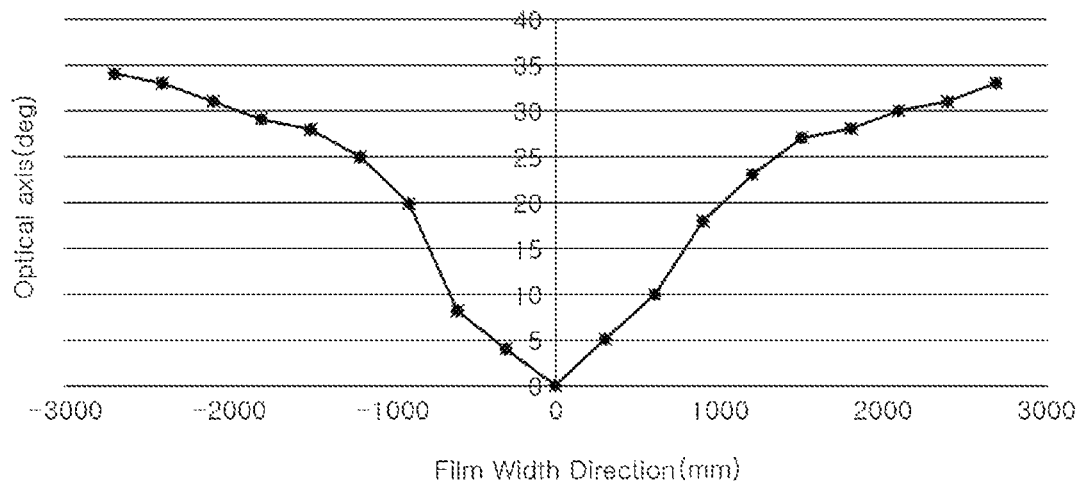

[Fig. 5]
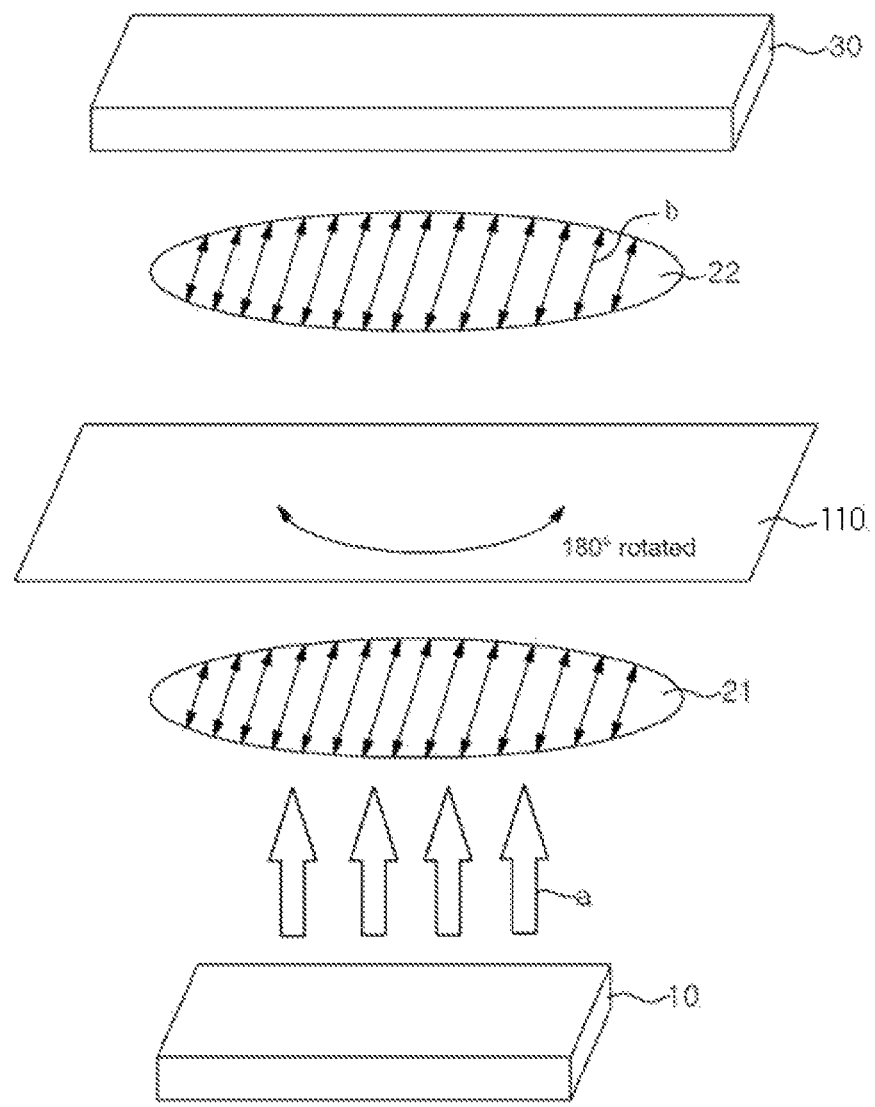

[Fig. 6]
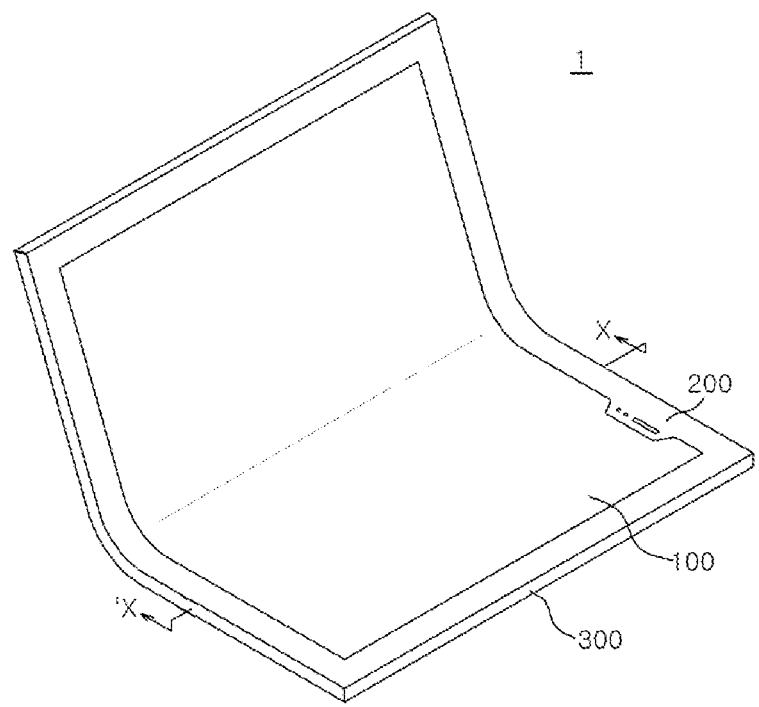
[Fig. 7]
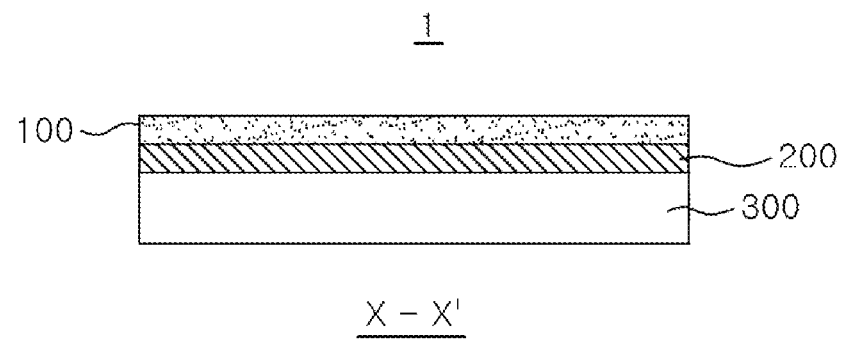
X – X'

[Fig. 8]
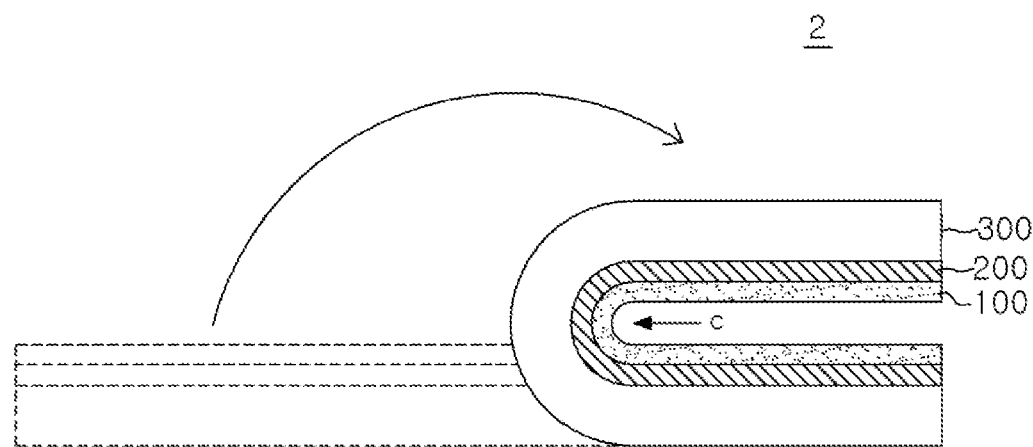
[Fig. 9]
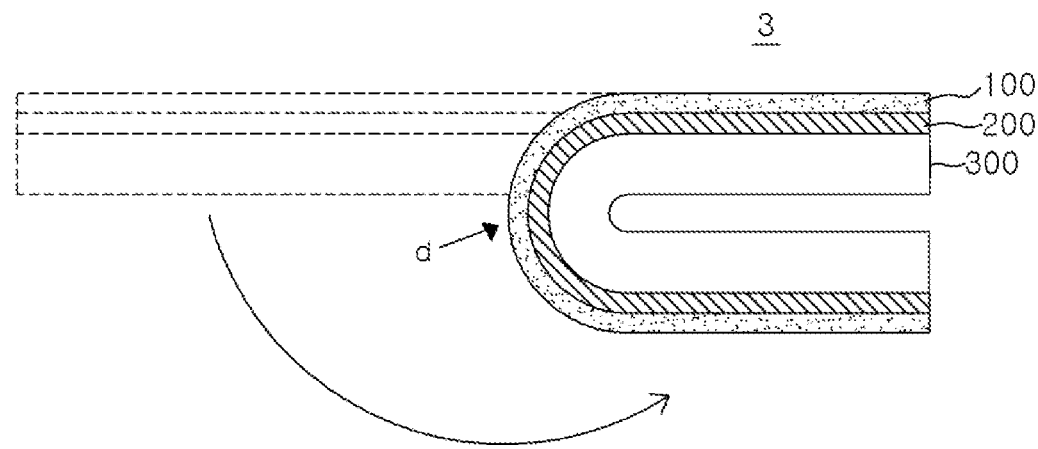
[Fig. 10]
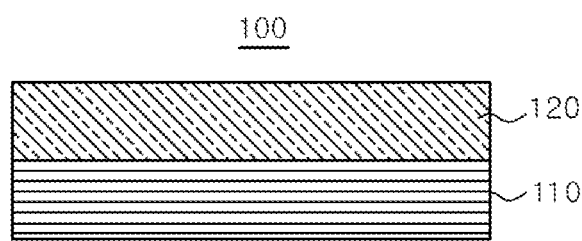

[Fig. 11]
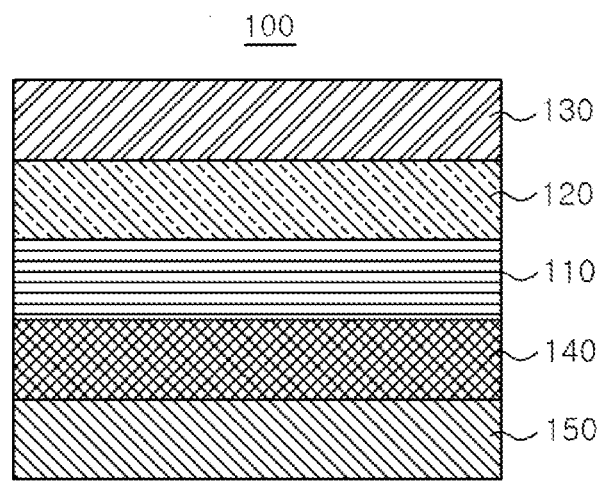
[Fig. 12]
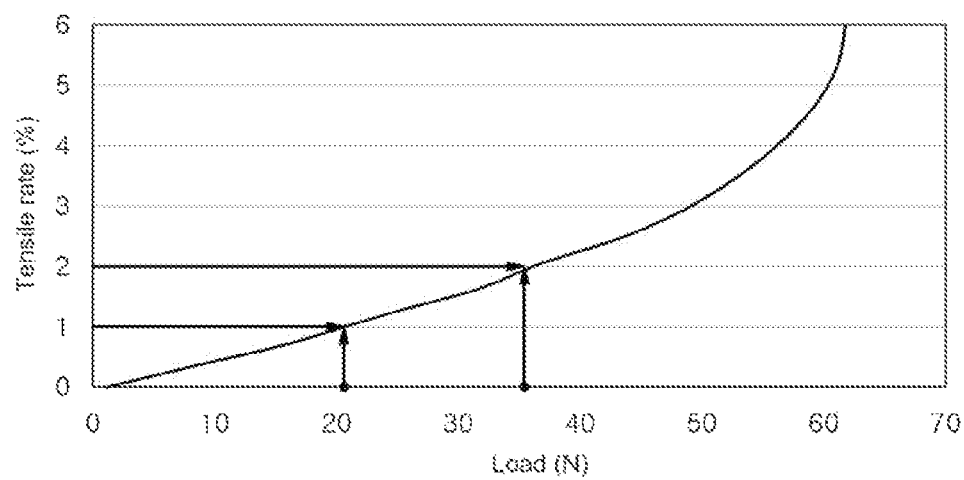

[Fig. 13]
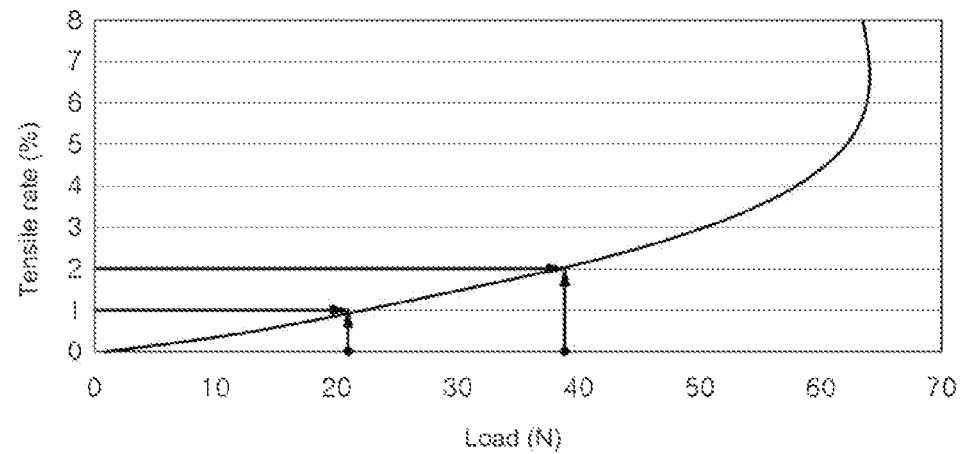
[Fig. 14]
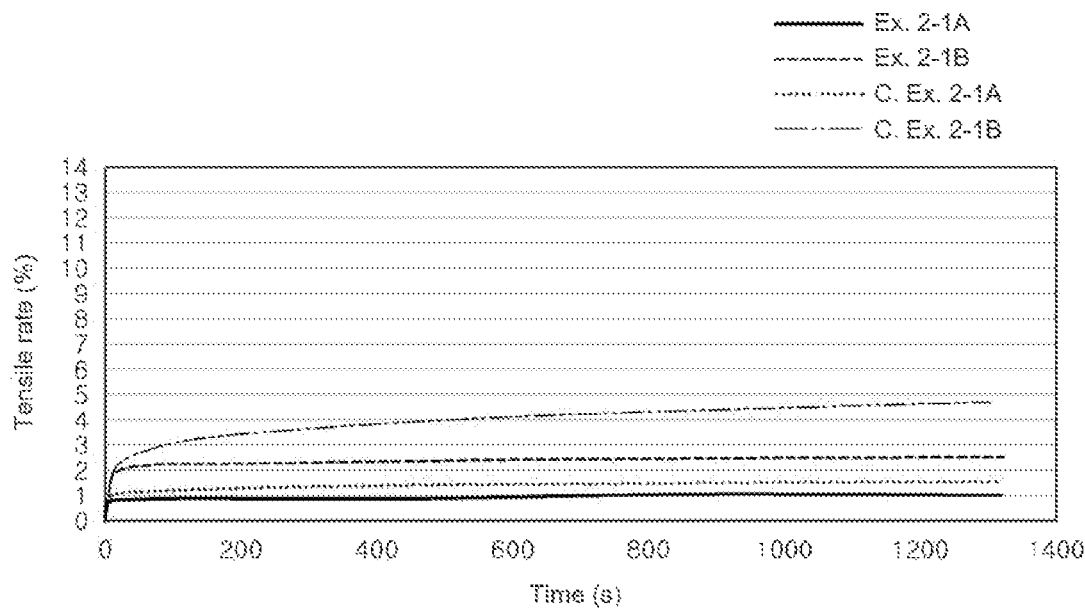

[Fig. 15]
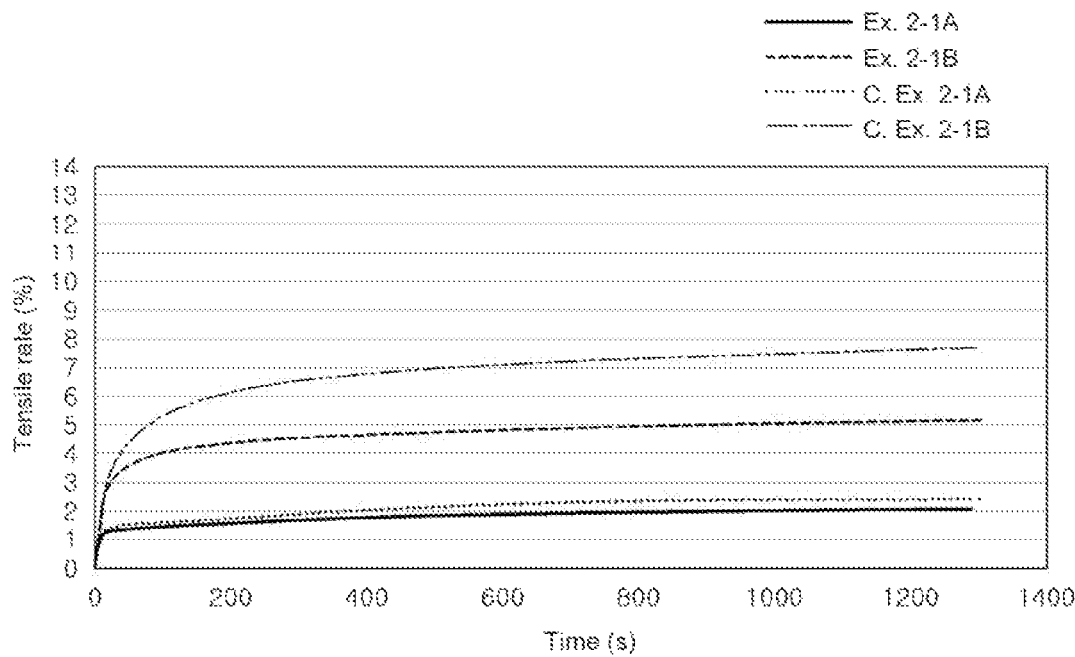
[Fig. 16]
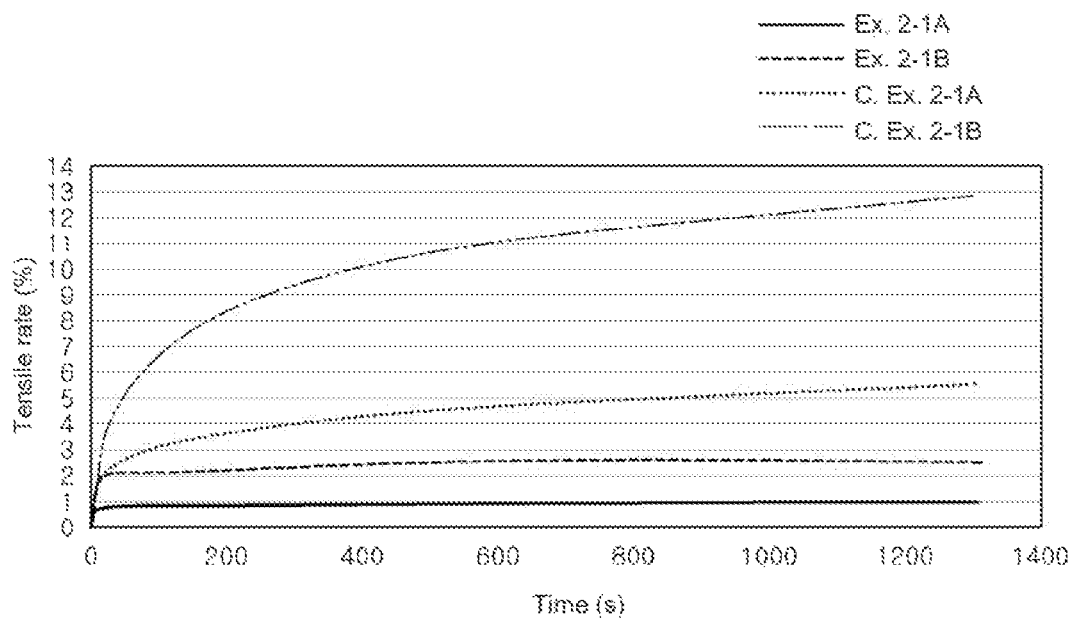

POLYESTER FILM AND PREPERATION METHOD THEREOF

The present application claims priority of Korean patent application number 10-2020-0169508 filed on Dec. 7, 2020, Korean patent application number 10-2020-0171208 filed on Dec. 9, 2020, Korean patent application number 10-2020-0171223 filed on Dec. 9, 2020, Korean patent application number 10-2021-0097041 filed on Jul. 23, 2021, and Korean patent application number 10-2021-0097042 filed on Jul. 23, 2021. The disclosure of each of the foregoing applications is incorporated herein in their entirety.

TECHNICAL FIELD

Embodiments relate to a polyester-based film and a process for preparing the same.

BACKGROUND ART

In recent years, as business transactions such as e-commerce and Internet banking through display devices such as smartphones, laptops, and tablet PCs have become common, research to enhance security by using a sensor capable of recognizing biometric information is continued.

As a method of using such biometric information, a method of recognizing a fingerprint is widely used. The fingerprint recognition method includes an optical method, an ultrasonic method, a capacitive method, an electric field measurement method, a thermal sensing method, and the like. The optical fingerprint recognition method among these fingerprint recognition methods uses a principle of irradiating light using a light source such as an LED (light emitting diode) inside a device and sensing the light reflected by a fingerprint through an image sensor. In the optical fingerprint recognition method, a fingerprint image reflected in light is acquired, which is compared with the fingerprint information registered in advance. Thus, as the amount of light irradiated and reflected through the device is sufficiently large and as the light irradiated and reflected is not distorted, the fingerprint recognition rate can be enhanced.

However, a protective film is attached to display devices such as smartphones, laptops, and tablet PCs to enhance their durability, which protective film reduces the amount of light irradiated and reflected and causes distortion of the irradiated and reflected light, thereby deteriorating the fingerprint recognition rate. In particular, since the thickness of a protective film may vary with the use and need, the amount of light and visibility may be reduced depending on the thickness of the film. Thus, research is continued on a protective film having a sufficiently large amount of light irradiated and reflected, along with excellent visibility, without reducing the durability and transparency, whereby it is possible to enhance the fingerprint recognition rate.

As an example, Korean Laid-open Patent Publication No. 2020-0125466 discloses a protective film with an enhanced fingerprint recognition rate by lowering the in-plane retardation to 25 nm or less. In order to significantly lower the retardation as described above, however, a highly precise control of the stretching process is required; thus, the process cost of the film may increase, and the productivity may be lowered.

Meanwhile, display technologies continue to develop driven by the demand in tandem with the development in IT devices. Technologies on curved displays and bended displays have already been commercialized. In recent years, flexible display devices that can be flexibly curved or folded in response to an external force are preferred in the field of mobile devices that require large screens and portability at the same time. In particular, a foldable display device has the great advantages that it is folded to a small size to enhance its portability when not in use, and it is unfolded to form a large screen when in use.

Flexible display devices mainly use a transparent polyimide film or ultra-thin glass (UTG) as a cover window. A transparent polyimide film is vulnerable to scratches from the outside, and ultra-thin glass has a problem in that the scattering prevention characteristics are poor; therefore, a protective film is applied to the surface thereof. In a protective film applied to a foldable display device, a tensile load continues to be applied to the film in the folded state. Thus, there is a problem in that the film in the folded portion may be delaminated or cracks may occur.

As an example, Korean Laid-open Patent Publication No. 2014-0104175 discloses a flexible hard coating film having enhanced flexibility by polymerizing an oligosiloxane containing an alicyclic epoxy group. The degree of flexibility is insufficient for the application to a foldable display, and the visibility of the film cannot be sufficiently secured, so that the fingerprint recognition rate is low.

[Prior Art Document]
[Patent Document]
(Patent Document 1) Korean Laid-open Patent Publication No. 2020-0125466
(Patent Document 2) Korean Laid-open Patent Publication No. 2014-0104175

DETAILED DESCRIPTION OF THE INVENTION

Technical Problem

Accordingly, the embodiments aim to provide a polyester-based film having excellent visibility and reliability, without reducing durability and transparency, and a process for preparing the same.

In addition, there are provided a polyester-based film having excellent flexibility, thereby hardly resulting in deformation even after a certain load is maintained for a long period of time, along with excellent scratch resistance, durability, transparency, and visibility, and a process for preparing the same.

Solution to the Problem

The polyester-based film according to an embodiment comprises a base layer; and a coating layer on at least one side of the base layer, wherein the light passage according to the following Relationship 1 is 91% or more, or the total transmittance for light of 380 nm to 780 nm is 92% or more.

$$\text{Light passage} = \frac{B}{A} \times 100 \qquad \text{[Relationship 1]}$$

In Relationship 1, A is the luminance (lux) when light of 530 nm is transmitted through two parallel polarizing plates, and B is the luminance (lux) when light of 530 nm is transmitted after the polyester-based film is placed between the two polarizing plates, wherein the transverse direction (TD) of the polyester-based film is positioned at an angle of 45° to the optical axis (b) of the two polarizing plates.

The polyester-based film according to another embodiment satisfies the following Relationship 2 in a first direction in the plane.

$$0.5 \leq |S_1 - S_2| \leq 3.1 \quad \text{[Relationship 2]}$$

In Relationship 2, $S_1$ is the final tensile rate (%) after $N_{1\%}$ is maintained for 20 minutes, and $S_2$ is the final tensile rate (%) after $N_{2\%}$ is maintained for 20 minutes, wherein $N_{1\%}$ is the load that stretches the polyester-based film by 1% in the first direction, and $N_{2\%}$ is the load that stretches the polyester-based film by 2% in the first direction.

The process for preparing a polyester-based film according to still another embodiment comprises preparing a base layer; and forming a coating layer on at least one side of the base layer, wherein the light passage of the polyester-based film according to the above Relationship 1 is 91% or more, or the total transmittance thereof for light of 380 nm to 780 nm is 92% or more.

The process for preparing a polyester-based film according to still another embodiment comprises melt-extruding a polyester-based resin to prepare an unstretched sheet; stretching the unstretched sheet 1 time to 1.5 times in a first direction at 70° C. to 125° C. and stretching it 3 times to 5 times in a second direction perpendicular to the first direction to prepare a stretched film; and heat-setting the stretched film at 160° C. to 230° C. to prepare a polyester-based film, and the polyester-based film satisfies the above Relationship 2 in a first direction within the plane.

The display device according to still another embodiment comprises a display panel; and a polyester-based film disposed on one side of the display panel, wherein the polyester-based film comprises a base layer and a coating layer on at least one side of the base layer, and the light passage of the polyester-based film according to the above Relationship 1 is 91% or more, or the total transmittance thereof for light of 380 nm to 780 nm is 92% or more.

The protective film according to still another embodiment comprises a polyester-based film; and a curable resin layer disposed on one side of the polyester-based film, wherein the polyester-based film satisfies the above Relationship 2 in a first direction within the plane.

Advantageous Effects of the Invention

As the polyester-based film according to the embodiment comprises a base layer and a coating layer on at least one side of the base layer, wherein the light passage according to Relationship 1 is 91% or more, or the total transmittance for light of 380 nm to 780 nm is 92% or more, its visibility is excellent. In addition, since the deviation of the orientation angle and the rate of change in the orientation angle with respect to the thickness are also very low, its visibility and reliability are more excellent.

In addition, as the polyester-based film satisfies preferred ranges of in-plane retardation, thickness direction retardation, moisture permeability, and impact strength, it has excellent durability and dimensional stability.

Accordingly, when the polyester-based film according to the embodiment is applied as a protective film for display devices such as smartphones, tablet PCs, laptops, and the like, their optical properties and durability are excellent, as well as their visibility and fingerprint recognition rate can be enhanced.

In the polyester-based film according to another embodiment, the strain with respect to tensile load satisfies a specific range, whereby it is possible to simultaneously achieve the flexibility that hardly causes deformation even when a certain load is maintained for a long period of time and the resistant characteristics to the impact of external pressing.

Accordingly, when the polyester-based film is applied as a protective film for flexible display devices, in particular, foldable display devices, whitening or cracks due to delamination hardly occurs even when folded tens of thousands of times.

In addition, as the polyester-based film according to the embodiment has an orientation angle, a light passage, a light transmittance, and a moisture permeability in preferred ranges, it is possible to secure excellent visibility, transparency, and durability.

BRIEF DESCRIPTION OF THE DRAWING

FIG. 1 shows the measurement results of orientation angle in the transverse direction of the polyester-based film of Example 1-1.

FIG. 2 shows the measurement results of orientation angle in the transverse direction of the polyester-based film of Example 1-3.

FIG. 3 shows the measurement results of orientation angle in the transverse direction of the polyester-based film of Example 1-5.

FIG. 4 shows the measurement results of orientation angle in the transverse direction of the polyester-based film of Comparative Example 1-4.

FIG. 5 shows a method of measuring the light passage of a polyester-based film.

FIG. 6 shows a foldable display device according to an embodiment.

FIG. 7 is a cross-sectional view illustrating the foldable display device of FIG. 6 taken along line X-X'.

FIG. 8 shows a cross-sectional view of an in-folding type foldable display device.

FIG. 9 shows a cross-sectional view of an out-folding type foldable display device.

FIG. 10 shows a protective film according to an embodiment.

FIG. 11 shows a protective film according to another embodiment.

FIG. 12 shows a curve of tensile rate (%) with respect to load (N) applied to the polyester-based film of Example 2-1 in the longitudinal direction (MD).

FIG. 13 shows a curve of tensile rate (%) with respect to load (N) applied to a polyester-based film in the 45° direction.

FIG. 14 shows curves of tensile rate (%) with respect to time (s) under a certain load applied to the polyester-based films of Example 2-1 and Comparative Example 2-1 in the longitudinal direction (MD).

FIG. 15 shows curves of tensile rate (%) with respect to time (s) under a certain load applied to the polyester-based films of Example 2-1 and Comparative Example 2-1 in the transverse direction (TD).

FIG. 16 shows curves of tensile rate (%) with respect to time (s) under a certain load applied to the polyester-based films of Example 2-1 and Comparative Example 2-1 in the 45° direction.

EXPLANATION OF REFERENCE NUMERALS

10: light-emitting apparatus
21: first polarizing plate
22: second polarizing plate
30: illuminometer a: direction of light
b: optical axis
1: foldable display device
2: in-folding type foldable display device
3: out-folding type foldable display device
c: in-folding point
d: out-folding point
100: protective film
110: polyester-based film
120: curable resin layer
130: hard coat layer
140: adhesive layer
150: release layer
200: cover window
300: display panel

BEST MODE FOR CARRYING OUT THE INVENTION

Hereinafter, the present invention will be described in detail with reference to embodiments. The embodiments are not limited to those described below. Rather, they can be modified into various forms as long as the gist of the invention is not altered.

Throughout the present specification, when a part is referred to as "comprising" an element, it is understood that other elements may be comprised, rather than other elements are excluded, unless specifically stated otherwise.

All numbers and expressions related to the quantities of components, reaction conditions, and the like used herein are to be understood as being modified by the term "about," unless otherwise indicated.

Throughout the present specification, the terms first, second, and the like are used to describe various components. But the components should not be limited by the terms. The terms are used only for the purpose of distinguishing one component from another.

In the present specification, in the case where each film, layer, or the like is mentioned to be formed "on" or "under" another film, layer, or the like, it means not only that one element is directly formed on or under another element, but also that one element is indirectly formed on or under another element with other element(s) interposed between them.

For the sake of description, the sizes of individual elements in the appended drawings may be exaggeratedly depicted, and they may differ from the actual sizes.

Polyester-Based Film

The polyester-based film according to an embodiment comprises a base layer; and a coating layer on at least one side of the base layer, wherein the light passage according to the following Relationship 1 is 91% or more.

$$\text{Light passage} = \frac{B}{A} \times 100 \quad \text{[Relationship 1]}$$

In Relationship 1, A is the luminance (lux) when light of 530 nm is transmitted through two parallel polarizing plates, and B is the luminance (lux) when light of 530 nm is transmitted after the polyester-based film is placed between the two polarizing plates, wherein the transverse direction (TD) of the polyester-based film is positioned at an angle of 45° to the optical axis (b) of the two polarizing plates.

In the optical fingerprint recognition method, light is irradiated from a light source such as an LED inside a device, and the light reflected by a fingerprint is sensed through an image sensor, which is compared with the fingerprint information registered in advance. Thus, as the amount of light irradiated and reflected through the device is sufficiently large and as the light irradiated and reflected is not distorted, the fingerprint recognition rate can be enhanced.

As the polyester-based film according to an embodiment satisfies 91% or more of light passage according to Relationship 1, the amount of light irradiated and reflected can be sufficiently secured, resulting in excellent visibility. Accordingly, when the polyester-based film is applied as a protective film for display devices such as smartphones, tablet PCs, laptops, and the like, as well as optical sensors such as barcode readers, their visibility is excellent, which can enhance the product information such as barcode and the fingerprint recognition rate.

Specifically, the polyester-based film may have a light passage of 91% or more according to Relationship 1. For example, the light passage may be 91% or more, 91.2% or more, 92% or more, or 92.5% or more, and 91% to 98%, 91% to 96%, 91% to 93%, 91.2% to 93%, or 92% to 93%. As the light passage according to Relationship 1 satisfies the above range, the amount of light irradiated and reflected through the film can be sufficiently secured, so that the visibility can be enhanced.

The light passage may be measured using an illuminometer. For example, the illuminometer may be a device for measuring luminance by arranging two polarizing plates in parallel at a specific interval, placing a polyester-based film between the two polarizing plates, and supplying and transmitting light.

FIG. 5 shows a method of measuring the light passage of a polyester-based film.

Specifically, as shown in FIG. 5, a light-emitting apparatus (10) is positioned at the lower position, and a first polarizing plate (21) and a second polarizing plate (22) are placed in parallel at a distance from each other over the light-emitting apparatus. Here, the distance between the light-emitting apparatus (10) and the first polarizing plate (21) may be shorter than the distance between the light-emitting apparatus (10) and the second polarizing plate (22), but it is not limited thereto.

For example, the distance between the light-emitting apparatus (10) and the first polarizing plate (21) may be 1 cm to 10 cm, 1.2 cm to 8 cm, 1.4 cm to 6.5 cm, 1.5 cm to 6 cm, 1.8 cm to 5.5 cm, or 2 cm to 5 cm, and the distance between the light-emitting apparatus (10) and the second polarizing plate (22) may be 5 cm to 30 cm, 7 cm to 28 cm, 8 cm to 25 cm, 9 cm to 23 cm, or 10 cm to 20 cm.

Thereafter, before and after the polyester-based film (110) is interposed between the first polarizing plate (21) and the second polarizing plate (22), light of 530 nm is supplied (a: light direction) from the light-emitting apparatus (10) at 12 V and transmitted to measure each luminance (lux), and the light passage is calculated according to Relationship 1.

In addition, the polyester-based film may be rotated within 180° and positioned. The light passage in the present specification is measured after the transverse direction (TD) of the film is positioned at an angle of 45° to the optical axis (b) of the two polarizing plates.

The polyester-based film according to another embodiment comprises a base layer; and a coating layer on at least one side of the base layer, wherein the total transmittance for light of 380 nm to 780 nm is 92% or more.

As the polyester-based film according to an embodiment satisfies 92% or more of total transmittance for light of 380 nm to 780 nm, the amount of light irradiated and reflected can be sufficiently secured, resulting in excellent visibility. Accordingly, when the polyester-based film is applied as a protective film for display devices such as smartphones, tablet PCs, laptops, and the like, as well as optical sensors such as barcode readers, their visibility is excellent, which can enhance the product information such as barcode and the fingerprint recognition rate.

For example, the total transmittance of the polyester-based film for visible light of 380 nm to 780 nm may be 92% or more, 92.2% or more, 92.5% or more, or 92.6% or more. As the total transmittance satisfies the above range, the amount of light irradiated and reflected through the film can be sufficiently secured, so that the visibility can be enhanced.

The total transmittance may be measured using a spectrophotometer. For example, light of 380 nm to 780 nm is incident on the surface of the film to measure the total transmittance every 10 nm, and the total transmittance may be calculated according to JIS R-3106.

The polyester-based film according to another embodiment satisfies the following Relationship 2 in a first direction in the plane.

$$0.5 \leq |S_1 - S_2| \leq 3.1 \quad \text{[Relationship 2]}$$

In Relationship 2, $S_1$ is the final tensile rate (%) after $N_{1\%}$ is maintained for 20 minutes, and Sz is the final tensile rate (%) after $N_{2\%}$ is maintained for 20 minutes, wherein $N_{1\%}$ is the load that stretches the polyester-based film by 1% in the first direction, and $N_{2\%}$ is the load that stretches the polyester-based film by 2% in the first direction.

FIG. 6 shows a foldable display device (1) according to an embodiment. Specifically, FIG. 6 illustrates a foldable display device (1) comprising a display panel (300), a cover window (200) disposed on the display panel, and a protective film (100) disposed on the cover window. The protective film (100) may be positioned on the front side of the cover window (200).

FIG. 7 is a cross-sectional view illustrating the foldable display device (1) of FIG. 6 taken along line X-X'. Specifically, FIG. 7 illustrates a foldable display device (1) having a structure in which a display panel (300), a cover window (200), and a protective film film (100) are sequentially laminated.

Specifically, the foldable display device (1) may be an in-folding type or an out-folding type depending on the folding direction. FIG. 3 shows a cross-sectional view of an in-folding type foldable display device (2). FIG. 4 shows a cross-sectional view of an out-folding type foldable display device (3).

Deformation may occur in the protective film (100) due to a load applied to the point (c) of inward folding in the in-folding type as shown in FIG. 8. Deformation may occur in the protective film (100) due to a load applied to the point (d) of outward folding in the out-folding type as shown in FIG. 9.

Such whitening or cracks can generally be solved when the modulus of a film is small at room temperature. Conventional polyester-based films generally have a large modulus at room temperature, so that they have a problem in that whitening or cracks would be easily generated due to delamination when applied to foldable display devices.

However, the polyester-based film according to an embodiment can achieve the flexibility, scratch resistance, and durability required for a protective film for flexible display devices, in particular, foldable display devices by adjusting the strain with respect to tensile load to a specific range. Accordingly, when the polyester-based film according to an embodiment is applied as a protective film for foldable display devices, whitening or cracks hardly occur even when folded tens of thousands of times, while maintaining its original characteristics such as flexibility, scratch resistance, and durability.

In addition, the polyester-based film according to an embodiment is more convenient than the conventionally used elastomer-based polymer films in terms of the process. In addition, it is possible to simultaneously achieve the flexibility and strong resistant characteristics to the impact of external pressing as compared with the polyester-based films modified to simply increase flexibility.

Specifically, in order to prevent whitening or cracks due to delamination that may occur when a film is applied to foldable display devices, an elastomer-based polymer film or a modified polyester-based film as a flexible material is conventionally used.

However, there arise problems in that an elastomer-based polymer film has sticky characteristics, which makes the process control difficult, it is difficult to prepare a flawless transparent film, resulting in a feeling of heterogeneity with the cover window, it is difficult to prepare a thin film, and it is readily deformed by an external impact such as pressing.

In addition, the conventional polyester-based films are poor in flexibility, that is, elastic restoring capability required for foldable display applications. Thus, although the polyester-based films may be modified to enhance flexibility, the polyester-based films thus modified have a problem in that such defects in appearance as dent marks due to foreign substances or external forces would occur during the production or use of the films.

In the polyester-based film according to an embodiment, however, the strain with respect to tensile load satisfies a specific range, whereby it is possible to simultaneously achieve the flexibility that hardly causes deformation even when a certain load is maintained for a long period of time and the resistant characteristics to the impact of external pressing. In addition, As the polyester-based film according to an embodiment has an orientation angle, a light passage, a light transmittance, and a moisture permeability in preferred ranges, it is possible to secure excellent visibility, transparency, and durability.

Accordingly, when the polyester-based film is applied as a protective film for flexible display devices, in particular, foldable display devices, it can exhibit excellent characteristics.

Specifically, the tensile rate and tensile load in Relationship 2 are measured at room temperature and a tensile rate of 50 mm/minute for a specimen (length 50 mm×width 10 mm) of the polyester-based film.

Specifically, $S_1$ is the final tensile rate (%) after $N_{1\%}$ is maintained for 20 minutes in a first direction in the plane of the polyester-based film according to an embodiment, and $S_2$ is the final tensile rate (%) after $N_{2\%}$ is maintained for 20 minutes in a first direction in the plane of the polyester-based film according to an embodiment.

More specifically, a method of measuring $S_1$ is as follows.

First, (1) a specimen of the polyester-based film having a length of 50 mm and a width of 10 mm is stretched in a first direction at room temperature and a tensile rate of 50 mm/minute to obtain a curve of tensile rate with respect to load. (2) The load ($N_{1\%}$) at the point when the length increases by 1% relative to the initial length is obtained from the tensile rate curve. (3) When the $N_{1\%}$ load is continuously applied for 20 minutes in the first direction of the specimen, the ratio of the increased length to the initial length of the specimen is $S_1$ as a final tensile rate (%).

In this specification, the first direction may be the transverse direction (TD) or the longitudinal direction (MD). Specifically, the first direction may be the longitudinal direction (MD), and the second direction perpendicular to the first direction may be the transverse direction (TD). More specifically, the second direction may be the main shrinkage direction.

In addition, a method of measuring $S_2$ is as follows.

First, (1) a specimen of the polyester-based film having a length of 50 mm and a width of 10 mm is stretched in a first direction at room temperature and a tensile rate of 50 mm/minute to obtain a curve of tensile rate with respect to load. (2) The load ($N_{2\%}$) at the point when the length increases by 2% relative to the initial length is obtained from the tensile rate curve. (3) When the $N_{2\%}$ load is continuously applied for 20 minutes in the first direction of the specimen, the ratio of the increased length to the initial length of the specimen is $S_2$ as a final tensile rate (%).

The value according to Relationship 2 may be 0.5 to 3.1, 0.7 to 2.8, 0.9 to 2.5, 1 to 2, or 1.2 to 1.8. As Relationship 2 is satisfied, when the polyester-based film is applied as a protective film for foldable display devices, whitening or cracks due to delamination hardly occurs even when folded tens of thousands of times.

$S_1$ may be 0.1 to 2.5, and $S_2$ may be 1.5 to 4.5. For example, $S_1$ may be 0.1 to 2.5, 0.1 to 2.3, 0.3 to 1.8, 0.5 to 1.6, or 0.8 to 1.2, and $S_2$ may be 1.5 to 4.5, 1.5 to 4, 1.8 to 3.5, 1.8 to 3, 2 to 3, or 2.2 to 2.7. As $S_1$ and $S_2$ satisfy the above ranges, when the polyester-based film is applied as a protective film for foldable display devices, whitening or cracks due to delamination hardly occurs even when folded tens of thousands of times.

In addition, $N_{1\%}$ in the first direction may be 10 N to 25 N, and $N_{2\%}$ in the first direction may be 28 N to 50 N. For example, Ni% in the first direction may be 10 N to 25 N, 28 N to 45 N, 30 N to 43 N, or 33 N to 40 N, and $N_2$% in the first direction may be 28 N to 50 N, 28 N to 45 N, 30 N to 43 N, or 33 N to 40 N.

In addition, the polyester-based film according to an embodiment satisfies the following Relationship 3 in a second direction perpendicular to the first direction.

$$0.5 \leq |S_3 - S_4| \leq 5.2 \qquad \text{[Relationship 3]}$$

In Relationship 3, $S_3$ is the final tensile rate (%) after $N_{1\%}$ is maintained for 20 minutes, and $S_4$ is the final tensile rate (%) after $N_{2\%}$ is maintained for 20 minutes, wherein $N_{1\%}$ is the load that stretches the polyester-based film by 1% in the second direction, and $N_{2\%}$ is the load that stretches the polyester-based film by 2% in the second direction.

A method of measuring $S_3$ and $S_4$ is the same as the method of measuring $S_1$ and $S_2$, except that tension is performed in the second direction instead of the first direction.

The value according to Relationship 3 may be 0.5 to 5.2, 0.7 to 5, 0.7 to 4.5, 1 to 4, 1.2 to 3.3, 1.5 to 2.8, 1.7 to 2.5, or 2 to 2.3. As Relationship 3 is satisfied, when the polyester-based film is applied as a protective film for foldable display devices, whitening or cracks due to delamination hardly occurs even when folded tens of thousands of times.

$S_3$ may be 0.8 to 2.4, and $S_4$ may be 2.3 to 7.5. For example, $S_3$ may be 0.8 to 2.4, 1 to 2.4, 1.2 to 2.4, 1.6 to 2.2 or 1.8 to 2.2, and $S_4$ may be 2.3 to 7.5, 2.8 to 7, 2.8 to 6.5, 3 to 6, 3.5 to 5.8 or 4.1 to 5.2. As $S_3$ and $S_4$ satisfy the above ranges, when the polyester-based film is applied as a protective film for foldable display devices, whitening or cracks due to delamination hardly occurs even when folded tens of thousands of times.

In addition, $N_{1\%}$ in the second direction may be 25 N to 45 N, and $N_{2\%}$ in the second direction may be 50 N to 70 N. For example, $N_{1\%}$ in the second direction may be 25 N to 45 N, 28 N to 45 N, 30 N to 43 N, 33 N to 40 N, or 33 N to 38 N, and N2% in the second direction may be 50 N to 70 N, 50 N to 65 N, 52 N to 63 N, or 57 N to 63 N. In addition, the polyester-based film according to an embodiment satisfies the following Relationship 4 in a third direction that is 45° to the first direction.

$$05 \leq |S_5 - S_6| \leq 7.2 \qquad \text{[Relationship 4]}$$

In Relationship 4, $S_5$ is the final tensile rate (%) after $N_{1\%}$ is maintained for 20 minutes, and $S_6$ is the final tensile rate (%) after $N_{2\%}$ is maintained for 20 minutes, wherein $N_{1\%}$ is the load that stretches the polyester-based film by 1% in the third direction, and $N_{2\%}$ is the load that stretches the polyester-based film by 2% in the third direction.

A method of measuring $S_5$ and $S_6$ is the same as the method of measuring $S_1$ and $S_2$, except that tension is performed in the third direction that is 45° to the first direction instead of the first direction.

The value according to Relationship 4 may be 0.5 to 7.2, 0.7 to 6.5, 0.7 to 5.8, 0.9 to 5, 0.9 to 4, 1.1 to 3.5, 1.1 to 2.8, 1.1 to 2.3, 1.2 to 1.8, or 1.2 to 1.6. As Relationship 4 is satisfied, when the polyester-based film is applied as a protective film for foldable display devices, whitening or cracks due to delamination hardly occurs even when folded tens of thousands of times.

$S_5$ may be 0.1 to 5.5, and $S_6$ may be 1.5 to 12.5. For example, $S_5$ may be 0.1 to 5.5, 0.1 to 5, 0.1 to 4.5, 0.2 to 4.3, 0.2 to 4, 0.5 to 3.3, 0.5 to 2.8, 0.7 to 2.3, 0.7 to 1.8, 0.9 to 1.6, or 0.9 to 1.3, and $S_6$ may be 1.5 to 12.5, 1.5 to 10, 1.5 to 8.5, 1.8 to 7, 1.8 to 6.5, 2 to 6, 2 to 5, 2 to 4, 2.2 to 3.3, 2.2 to 3, or 2.2 to 2.7. As $S_5$ and $S_6$ satisfy the above ranges, when the polyester-based film is applied as a protective film for foldable display devices, whitening or cracks due to delamination hardly occurs even when folded tens of thousands of times.

In addition, $N_{1\%}$ in the third direction may be 10 N to 25 N, and $N_{2\%}$ in the third direction may be 28 N to 50 N. For example, $N_{1\%}$ in the third direction may be 10 N to 25 N, 28 N to 45 N, 30 N to 43 N, or 33 N to 40 N, and $N_{2\%}$ in the third direction may be 28 N to 50 N, 28 N to 45 N, 30 N to 43 N, or 33 N to 40 N.

$S_1:S_3$ may be 0.4 to 0.7:1, and $S_2:S_4$ may be 0.4 to 0.7:1. For example, $S_1:S_3$ may be 0.4 to 0.7:1, 0.45 to 0.65:1, or 0.45 to 0.6:1, and $S_2:S_4$ may be 0.4 to 0.7:1, 0.45 to 0.65:1, or 0.45 to 0.6:1. As the ratios of $S_1$ to $S_3$ and $S_2$ to $S_4$ each satisfy the above ranges, it is possible to prevent delamination, whereby whitening or cracks due to delamination hardly occurs even when folded tens of thousands of times.

$S_3:S_5$ may be 0.4 to 0.7:1, and $S_4:S_6$ may be 0.4 to 0.7:1. For example, $S_3:S_5$ may be 0.4 to 0.7:1, 0.45 to 0.65:1, or 0.45 to 0.6:1, and $S_4:S_6$ may be 0.4 to 0.7:1, 0.45 to 0.65:1, or 0.45 to 0.6:1. As the ratios of $S_3$ to $S_5$ and $S_4$ to $S_6$ each satisfy the above ranges, it is possible to prevent delamination, whereby whitening or cracks due to delamination hardly occurs even when folded tens of thousands of times.

$S_1:S_5$ may be 1:0.8 to 1.4, and $S_2:S_6$ may be 1:0.8 to 1.4. For example, $S_1:S_5$ may be 1:0.8 to 1.4, 1:0.85 to 1.3, 1:0.9 to 1.2 or 1:0.95 to 1.1, and $S_2:S_6$ may be 1:0.8 to 1.4, 1:0.85 to 1.3, 1:0.9 to 1.2, or 1:0.95 to 1.1. As the ratios of $S_1$ to $S_5$ and $S_2$ to $S_6$ each satisfy the above ranges, it is possible to prevent delamination, whereby whitening or cracks due to delamination hardly occurs even when folded tens of thousands of times.

$N_{1\%}:N_{2\%}$ in the first direction may be 1:1.5 to 3. For example, $N_{1\%}:N_{2\%}$ in the first direction may be 1:1.5 to 2.8, 1:1.5 to 2.3, or 1:1.6 to 2.1.

$N_{1\%}:N_{2\%}$ in the second direction may be 1:1.1 to 2.5. For example, $N_{1\%}:N_{2\%}$ in the second direction may be 1:1.1 to 2.5, 1:1.2 to 2.3, 1:1.3 to 2.1, or 1:1.5 to 2.

$N_{1\%}:N_{2\%}$ in the third direction may be 1:1.5 to 3. For example, $N_{1\%}:N_{2\%}$ in the third direction may be 1:1.5 to 2.8, 1:1.5 to 2.5, or 1:1.6 to 2.2.

As the ratios of $N_{1\%}$ to $N_{2\%}$ in the first to third directions each satisfy the above ranges, it is possible to prevent delamination, whereby whitening or cracks due to delamination hardly occurs even when folded tens of thousands of times.

Meanwhile, in the optical fingerprint recognition method, a fingerprint image reflected in light is acquired, which is compared with the fingerprint information registered in advance. Thus, in order to enhance the fingerprint recognition rate of the optical fingerprint recognition method, there should be no distortion of light reflected after the fingerprint is recognized. Thus, as the orientation angle and the deviation of the orientation angle of a protective film attached to the surface of a display device such as a smartphone is smaller, the fingerprint recognition rate and the effect of preventing fingerprint recognition errors may be enhanced.

The polyester-based film according to an embodiment has excellent durability and transparency, as well as an excellent fingerprint recognition rate with the effect of preventing fingerprint recognition errors.

The polyester-based film has an entire width of 50 cm to 6,000 cm. For example, the entire width of the polyester-based film may be 50 cm to 6,000 cm, 50 cm to 5,500 cm, 50 cm to 5,000 cm, 50 cm to 4,000 cm, 50 cm to 3,000 cm, 50 cm to 2,500 cm, 50 cm to 2,300 cm, 50 cm to 2,000 cm, 50 cm to 1,800 cm, 50 cm to 1,500 cm, 50 cm to 1,300 cm, 50 cm to 1,000 cm, 50 cm to 800 cm, 70 cm to 800 cm, or 90 cm to 700 cm.

In addition, the polyester-based film may have a deviation of the orientation angle within ±5° for the entire width. Specifically, the deviation of the orientation angle according to the average value of the orientation angles measured for the entire width of the film may be within ±5°, within ±4.5°, within ±4°, within ±3.5°, within ±3°, within ±2.8°, within ±2.5°, within ±2°, within ±1.5°, within ±1.2°, within ±1°, within ±0.9°, or within ±0.7°. As the deviation of the orientation angle for the entire width satisfies the above range, excellent visibility can be secured at any position of the film, whereby the reliability of visibility is very excellent.

In addition, the orientation angle may be within ±5° in the transverse direction in 90% or more of the entire width. For example, the polyester-based film may have an orientation angle within ±5°, within ±4°, within ±3.8°, within ±3.5°, within ±3.3°, within ±3°, within ±2.8°, within ±2.5°, within ±2°, within ±1.5°, within ±1.2°, within ±1°, within ±0.9°, or within ±0.8° in the transverse direction in 90% or more, 95% or more, 98% or more, 99% or more, or 100% of the entire width. As the orientation angle satisfies the above range, the distortion of light irradiated and reflected is low, resulting in enhanced visibility and reliability thereof. Thus, the fingerprint recognition rate and the effect of preventing fingerprint recognition errors are excellent.

Although the polyester-based film according to an embodiment has a wide width of 50 cm to 6,000 cm, its orientation angle satisfies the range of within ±5° in the transverse direction in 90% or more of the entire width, while the light passage is not lowered. Thus, the distortion of light irradiated and reflected is low, resulting in excellent visibility and reliability thereof.

In addition, the ratio of the orientation angle to the light passage for the entire width may be 1:50 to 155. For example, the ratio of the orientation angle to the light passage for the entire width may be 1:50 to 155, 1:55 to 152, 1:60 to 90, 1:50 to 110, 1:50 to 100, 1:52 to 95, 1:55 to 90, 1:60 to 85, 1:130 to 160, 1:130 to 155 or 1:130 to 152. As the ratio of the orientation angle to the light passage for the entire width satisfies the above range, the amount of light irradiated and reflected through the film can be sufficiently secured, while the visibility can be further enhanced.

In addition, the rate of change in the orientation angle in the transverse direction of the polyester-based film may be 3°/10 cm or less. For example, when the polyester-based film is cut at an interval of 10 cm in the transverse direction and each orientation angle is measured, the rate of change in the orientation angle may be 3°/10 cm or less, 2.5°/10 cm or less, 2.3°/10 cm or less, 2°/10 cm or less, 1.5°/10 cm or less, 1.3°/10 cm or less, 1°/10 cm or less, 0.8°/10 cm or less, 0.6°/10 cm or less, 0.5°/10 cm or less, 0.3°/10 cm or less, or 0.2°/10 cm or less. As the rate of change in the orientation angle satisfies the above range, excellent visibility can be secured at any position of the film, whereby the reliability of visibility is very excellent.

The polyester-based film may have a deviation of the orientation angle within ±5° for the entire width. Specifically, the deviation of the orientation angle according to the average value of the orientation angles measured for the entire width of the film may be within ±5°, within ±4.5°, within ±4°, within ±3.5°, within ±3°, within ±2.8°, within ±2.5°, within ±2°, within ±1.5°, within ±1.2°, within ±1°, within ±0.9°, or within ±0.7°. As the deviation of the orientation angle for the entire width satisfies the above range, excellent visibility can be secured at any position of the film, whereby the reliability of visibility is very excellent.

In addition, the deviation of the orientation angle may be within ±2.5° in the transverse direction within ±2,000 mm from the central axis of the polyester-based film. For example, the deviation of the orientation angle may be within ±2.5°, within ±2°, within ±1.5°, within ±1.2°, within ±1°, within ±0.9°, or within ±0.7°, in the transverse direction within ±2,000 mm from the central axis of the polyester-based film.

In addition, the deviation of the orientation angle may be within ±5° in the transverse direction exceeding ±2,000 mm from the central axis of the polyester-based film. For example, the deviation of the orientation angle may be within ±5°, within ±4.5°, within ±4°, within ±3.5°, within ±3°, within ±2.8°, within ±2.5°, within ±2°, within ±1.5°, within ±1.2°, within ±1°, within ±0.9°, or within ±0.7°, in the transverse direction exceeding ±2,000 mm from the central axis of the polyester-based film.

The difference ($\theta_1-\theta_2$) between the orientation angle ($\theta_1$) at any point of the polyester-based film and the orientation angle ($\theta_2$) at a point located within ±2,000 mm from the above point may be within ±5°. For example, the difference ($\theta_1-\theta_2$) between the orientation angle ($\theta_1$) at any point of the polyester-based film and the orientation angle ($\theta_2$) at a point located within ±2,000 mm, within ±1,800 mm, within ±1,500 mm, within ±1,300 mm, within ±1,000 mm, within ±800 mm, within ±500 mm, within ±300 mm, within ±100 mm, or within ±50 mm, from the above point may be within ±5°, within ±4.5°, within ±4°, within ±3.5°, within ±3°, within ±2.8°, within ±2.5°, within ±2°, within ±1.5°, within ±1.2°, within ±1°, within ±0.9°, within ±0.7°, within ±0.5°, within ±0.4°, within ±0.2°, within ±0.1°, or within ±0.05°.

The polyester-based film may have a thickness of 30 μm to 150 μm. For example, the thickness of the polyester-based film may be 30 μm to 150 μm, 40 μm to 150 μm, 45 μm to 145 μm, 50 μm to 140 μm, 55 μm to 135 μm, or 55 μm to 130 μm. The thickness of the polyester-based film may be selected within the above range according to the needs such as enhancement in moldability or durability. Specifically, if the thickness of the polyester-based film is less than 30 μm, its moldability may be excellent whereas its durability may be low. If it exceeds 150 μm, its durability is excellent whereas its moldability is low, whereby its quality would be poor when applied as a protective film.

In particular, since the polyester-based film is not affected by its thickness in terms of the orientation angle, rate of change in orientation angle, and deviation of orientation angle, excellent visibility can be secured without deterioration in such properties as transparency, moldability, and durability.

In addition, the polyester-based film may have a deviation in the thickness of 5 μm or less. For example, the deviation of the thickness of the polyester-based film may be 5 μm or less, 4 μm or less, 3 μm or less, 2.5 μm or less, 2 μm or less, or 1.8 μm or less, and 0.05 μm to 5 μm, 0.1 μm to 4 μm, 0.1 μm to 3 μm, 0.3 μm to 2 μm, or 0.3 μm to 1.8 μm. As the thickness deviation satisfies the above range, it is possible to have uniform visibility along with an appropriate deviation of retardation.

Specifically, the thickness deviation may be calculated by the following Equation A.

Thickness deviation (μm)=maximum thickness in the transverse direction (μm)−minimum in the transverse direction (μm)  [Equation A]

The difference (D1−D2) between the thickness (D1) at any point of the polyester-based film and the thickness (D2) at a point located within ±2,000 mm from the above point may be within ±4 μm. For example, the difference (D1−D2) between the thickness (D1) at any point of the polyester-based film and the thickness (D2) at a point located within ±2,000 mm, within ±1,800 mm, within ±1,500 mm, within ±1,300 mm, within ±1,000 mm, within ±800 mm, within ±500 mm, within ±300 mm, within ±100 mm, or within ±50 mm, from the above point may be within ±4 μm, within ±3.5 μm, within ±3 μm, within ±2.5 μm, within ±2.3 μm, within ±2 μm, within ±1.8 μm, within ±1 μm, or within ±0.8 μm.

The polyester-based film may have an in-plane retardation (Re, 550 nm) of 5,000 nm to 13,000 nm. For example, the in-plane retardation (Re) of the polyester-based film at a wavelength of 550 nm may be 5,000 nm to 13,000 nm, 5,500 nm to 12,500 nm, 5,700 nm to 12,000 nm, 6,000 nm to 12,000 nm, 7,000 nm to 13,000 nm, 8,000 nm to 13,000 or 8,500 nm to 12,500 nm. As the in-plane retardation satisfies the above range, the durability can be improved, and the difference in refractive index between the first direction and the second direction perpendicular to the first direction is maximized, so that distortion of light cannot be recognized, thereby securing excellent visibility.

Specifically, the in-plane retardation (Re) is a parameter defined by a product of anisotropy (ΔNxy=|Nx−Ny|) of refractive indices (Nx, Ny) of two mutually perpendicular axes in the plane of a film and the film thickness d (nm), which is a measure of the degree of optical isotropy and anisotropy. More specifically, the in-plane retardation (Re) may be calculated by the following Equation B.

$Re = \Delta Nxy \times d$  [Equation B]

In Equation B, d is the thickness of the film, ΔNxy is an absolute value (ΔNxy=|Nx−Ny|) of the difference between Nx and Ny, Nx is a refractive index in the in-plane slow axis direction, and Ny is a refractive index in the in-plane fast axis direction. Specifically, Nx may be a refractive index in the longitudinal direction (MD), and Ny may be a refractive index in the transverse direction (TD).

The refractive indices (Nx, Ny) of two axes may be measured using an Otsuka refractometer (RETS-100, measuring wavelength 550 nm), but it is not limited thereto.

In addition, the polyester-based film may have a deviation of the in-plane retardation (Re) of 600 nm/m or less. For example, the deviation of the in-plane retardation (Re) of the polyester-based film may be 600 nm/m or less, 500 nm/m or less, 400 nm/m or less, 300 nm/m or less, or 200 nm/m or less, and 5 nm/m to 600 nm/m, 5 nm/m to 500 nm/m, 10 nm/m to 400 nm/m, 10 nm/m to 350 nm/m, 10 nm/m to 300 nm/m, or 10 nm/m to 200 nm/m. As the deviation of the in-plane retardation satisfies the above range, the durability can be improved, as well as the difference in refractive index between the first direction and the second direction perpendicular to the first direction is maximized, so that distortion of light cannot be recognized, thereby securing excellent visibility.

In addition, the thickness direction retardation (Rth, 550 nm) is a parameter defined by an average of the values obtained as a product of two birefringences ΔNxz (=|Nx−Nz|) and ΔNyz (=|Ny−Nz|) observed on a cross-section in the film thickness direction and the film thickness d (nm). Specifically, the thickness direction retardation (Rth) may be calculated by the following Equation C.

$$Rth = \frac{(\Delta Nxz + \Delta Nyz)}{2} \times d$$  [Equation C]

In Equation C, d is the thickness of the film, ΔNxz is an absolute value (ΔNxz=|Nx−Nz|) of the difference between Nx and Nz, and ΔNyz is an absolute value (ΔNyz=|Ny−Nz|) of the difference between Ny and Nz. Nx is a refractive index in the in-plane slow axis direction, Ny is a refractive index in the in-plane fast axis direction, and Nz is a refractive index in the thickness direction. Specifically, Nx may be a refractive index in the longitudinal direction (MD), and Ny may be a refractive index in the transverse direction (TD).

The polyester-based film may have a thickness direction retardation (Rth) of 8,000 nm to 14,000 nm. For example, the thickness direction retardation (Rth) of the polyester-based film at a wavelength of 550 nm may be 8,000 nm to 14,000 nm, 8,000 nm to 13,500 nm, 8,500 nm to 13,000 nm, or 8,500 nm to 12,800 nm. As the thickness direction retardation satisfies the above range, the durability can be enhanced, as well as the difference in refractive index between the first direction and the second direction perpendicular to the first direction is maximized, so that distortion of light cannot be recognized, thereby securing excellent visibility.

In addition, the polyester-based film may have a moisture permeability of 20 g/m²·day or less. For example, the moisture permeability of the polyester-based film may be 20 g/m²·day or less, 18 g/m²·day or less, 15 g/m²·day or less, 12 g/m²·day or less, or 10 g/m²·day or less, and 0.1 g/m²·day to 20 g/m²·day or less, 0.5 g/m²·day to 18 g/m²·day, 1 g/m²·day to 15 g/m²·day, 3 g/m²·day to 13 g/m²·day, 4 g/m²·day to 11 g/m²·day, 4.5 g/m²·day to 10 g/m²·day, or 4.8 g/m²·day to 10 g/m²·day As the moisture permeability satisfies the above range, excellent durability can be secured. Specifically, the polyester-based film having a moisture permeability in the above range is significantly excellent in moisture permeability and dimensional stability as compared with TAC films used as a conventional protective film. When the polyester-based film is applied as a protective film for a display device, the display device can be effectively protected from an external moisture environment.

The polyester-based film may have a difference of 0.08 to 0.14 between the refractive index in a first direction and that in a second direction perpendicular to the first direction. For example, the difference between the refractive indices of the polyester-based film in the first direction and the second direction perpendicular to the first direction may be 0.08 to 0.14, 0.08 to 0.13, 0.08 to 0.125, 0.083 to 0.115, or 0.085 to 0.11. As the difference between the refractive indices in a first direction and a second direction satisfies the above range, distortion of light cannot be recognized, whereby excellent visibility can be secured. The polyester-based film has a UV durability ($TSM_{UV}$) of 80% or more in the longitudinal direction (MD) according to the following Equation D.

$$TSM_{UV} = \frac{TSM2}{TSM1} \times 100 \quad \text{[Equation D]}$$

In Equation D, $TSM_{UV}$ is a UV durability (%) in the MD direction, TSM1 is an initial tensile strength in the MD direction, and TSM2 is a tensile strength in the MD direction measured after exposure to UV light for 48 hours at a dose of 0.68 W/m².

For example, the UV durability ($TSM_{UV}$) according to Equation D may be 80% or more or 82% or more and may be 80% to 100% or 80% to 95%.

Alternatively, the polyester-based film has a UV durability ($TST_{UV}$) of 80% or more in the transverse direction (TD) according to the following Equation E.

$$TST_{UV} = \frac{TST2}{TST1} \times 100 \quad \text{[Equation E]}$$

In Equation E, $TST_{UV}$ is a UV durability (%) in the TD direction, TST1 is an initial tensile strength in the TD direction, and TST2 is a tensile strength in the TD direction measured after exposure to UV light for 48 hours at a dose of 0.68 W/m².

For example, the UV durability ($TST_{UV}$) according to Equation E may be 80% or more, 85% or more, or 88% or more, and may be 80% to 100% or 80% to 95%.

Specifically, the UV durability is evaluated based on tensile strength. Since the polyester-based film is a stretched film, it may have different UV durability depending on directions.

As both the UV durability ($TSM_{UV}$) in the MD direction and the UV durability ($TST_{UV}$) in the TD direction of the polyester-based film according to an embodiment satisfy 80% or more, it can maintain excellent durability even in repeated strong UV light.

In addition, the polyester-based film may comprise a polyester-based resin.

Specifically, the polyester-based resin may be a homopolymer resin or a copolymer resin in which a dicarboxylic acid and a diol are polycondensed. In addition, the polyester-based resin may be a blend resin in which the homopolymer resins or the copolymer resins are mixed. More specifically, the polyester-based resin may be a mixture of a dicarboxylic acid and a diol at a molar ratio of 1:1.

The dicarboxylic acid may be terephthalic acid, isophthalic acid, orthophthalic acid, 2,5-naphthalene dicarboxylic acid, 2,6-naphthalene dicarboxylic acid, 1,4-naphthalene dicarboxylic acid, 1,5-naphthalene dicarboxylic acid, diphenylcarboxylic acid, diphenoxyethane dicarboxylic acid, diphenylsulfonic acid, anthracenedicarboxylic acid, 1,3-cyclopentanedicarboxylic acid, 1,3-cyclohexanedicarboxylic acid, 1,4-cyclohexanedicarboxylic acid, hexahydroterephthalic acid, hexahydroisophthalic acid, malonic acid, dimethyl malonic acid, succinic acid, 3,3-diethyl succinic acid, glutaric acid, 2,2-dimethylglutaric acid, adipic acid, 2-methyladipic acid, pimelic acid, azelaic acid, sebacic acid, suberic acid, or dodecadicarboxylic acid.

In addition, the diol may be ethylene glycol, propylene glycol, hexamethylene glycol, neopentyl glycol, 1,2-cyclohexanedimethanol, 1,4-cyclohexanedimethanol, decamethylene glycol, 1,3-propanediol, 1,4-butanediol, 1,5-pentanediol, 1,6-hexanediol, 2,2-bis(4-hydroxyphenyl)propane, or bis(4-hydroxyphenyl) sulfone.

Preferably, the polyester-based resin may be an aromatic polyester-based resin having excellent crystallinity. Specifically, it may have a polyethylene terephthalate (PET) resin as a main component. For example, the polyester-based film may be a polyethylene terephthalate (PET) film.

For example, the polyester-based film may comprise a polyester-based resin, specifically, a polyethylene terephthalate resin, in an amount of 85% by weight or more, more specifically, 90% by weight or more, 95% by weight or more, or 99% by weight or more.

Alternatively, the polyester-based film may comprise a polyester-based resin other than the polyethylene terephthalate resin. Specifically, the polyester-based film may comprise two kinds of polyester-based resins. More specifically, the polyester-based film may comprise a polyethylene terephthalate resin and a polyester-based resin other than the polyethylene terephthalate resin.

For example, the polyester-based film may comprise a polyethylene naphthalate resin in an amount of 15% by weight or less, 0.1% by weight to 10% by weight, or 0.1% by weight to 5% by weight.

In addition, for example, the polyester-based film may comprise 85% by weight or more of a polyethylene terephthalate resin and 15% by weight or less of a polyethylene naphthalate (PEN) resin. More specifically, the polyester-based film may comprise 85% by weight or more of a polyethylene terephthalate resin and 0.1% by weight to 10% by weight or 0.1% by weight to 5% by weight of a polyethylene naphthalate resin. As the polyester-based film satisfies the above composition and content, it is possible to enhance its mechanical properties such as tensile strength in the preparation process thereof that comprises heating, stretching, and the like.

Base Layer

The polyester-based film according to an embodiment comprises a based layer and a coating layer on at least one side of the base layer.

The base layer may comprise a polyester-based resin. Details on the polyester-based resin are as described above.

The base layer may have a thickness of 30 μm to 145 μm. For example, the thickness of the base layer may be 30 μm to 145 μm, 35 μm to 140 μm, 40 μm to 135 μm, 45 μm to 130 μm, or 50 μm to 130 μm. The thickness of the base layer may be selected within the above range according to the needs such as enhancement in moldability or durability. Specifically, if the thickness of the base layer is less than 30 μm, its moldability may be excellent whereas its durability may be low. If it exceeds 145 μm, its durability is excellent whereas its moldability is low, whereby its quality would be poor when applied as a protective film.

Coating Layer

The polyester-based film according to an embodiment comprises a coating layer on at least one side of the base layer.

Specifically, the coating layer may comprise at least one selected from the group consisting of a urethane-based resin, an ester-based resin, and an acrylic-based resin. As the polyester-based film comprises a coating layer comprising at least one selected from the group consisting of a urethane-based resin, an ester-based resin, and an acrylic-based resin on at least one side of the base layer, it is possible to enhance the durability and folding characteristics without deteriorating the light passage, total transmittance, and orientation angle characteristics.

For example, the coating layer may comprise at least one selected from the group consisting of a urethane-based resin, an ester-based resin, and an acrylic-based resin in an amount of 45% by weight to 65% by weight or 50% by weight to 60% by weight.

According to an embodiment, the coating layer may be disposed on only one side of the base layer, or it may be disposed on both sides of the base layer.

Specifically, the coating layer may comprise a first coating layer disposed on one side of the base layer, or it may comprise a first coating layer disposed on one side of the base layer and a second coating layer disposed on the other side of the base layer.

According to an embodiment, the resin contained in the first coating layer and the resin contained in the second coating layer may be the same or different as needed.

In addition, the first coating layer and the second coating layer may each have a thickness of 50 nm to 100 nm. For example, the thickness of the first coating layer may be 50 nm to 100 nm, 55 nm to 95 nm, 60 nm to 85 nm, 65 nm to 80 nm, or 67 nm to 75 nm, and the thickness of the second coating layer may be 50 nm to 100 nm, 55 nm to 95 nm, 60 nm to 85 nm, 65 nm to 80 nm, or 67 nm to 75 nm.

As the thicknesses of the first coating layer and the second coating layer satisfy the above ranges, it is possible to maximize the effect of enhancing the durability and folding characteristics without deteriorating the light passage, total transmittance, and orientation angle characteristics.

In addition, the thickness ratio of the first coating layer to the second coating layer may be 1:0.5 to 2.0. For example, the thickness ratio of the first coating layer to the second coating layer may be 1:0.5 to 2.0, 1:0.7 to 1.6, 1:0.8 to 1.3, 1:0.9 to 1.1, or 1:0.95 to 1.05.

Curable Resin Layer

According to another embodiment, a curable resin layer may be further comprised on at least one side of the base layer. Specifically, the curable resin layer may be disposed on one side of the base layer or one side of the coating layer.

More specifically, the polyester-based film may comprise a coating layer formed on one side of the base layer and a curable resin layer formed on the other side of the base layer.

Alternatively, the polyester-based film may comprise a first coating layer and a second coating layer formed on both sides of the base layer and a curable resin layer formed on one side of the first coating layer and the second coating layer. Specifically, in the polyester-based film, a curable resin layer, a first coating layer, a base layer, a second coating layer, and a curable resin layer may be sequentially laminated, or a curable resin layer, a first coating layer, a base layer, and a second coating layer may be sequentially laminated.

Details on the base layer and coating layer are as described above.

The curable resin layer may comprise a photocurable resin or a thermosetting resin. For example, the photocurable resin may comprise a urethane acrylate oligomer, an epoxy acrylate oligomer, or a mixture thereof, and the thermosetting resin may comprise a urethane acrylate polyol, a melamine acrylate polyol, an epoxy acrylate polyol, or a mixture thereof. For example, the curable resin layer may comprise a urethane acrylate-based resin.

In addition, the curable resin layer may further comprise at least one additive selected from the group consisting of a crosslinking agent, an antistatic agent, and a defoaming agent. For example, the crosslinking agent may be a silane-based crosslinking agent, which may be alkoxysilanes such as vinylethoxysilane, vinyl-tris-(β-methoxyethoxy)silane, methacryloylpropyltrimethoxysilane, γ-amino-propyltriethoxysilane, γ-mercaptopropyltrimethoxysilane, methyltrimethoxysilane, methyltriethoxysilane, and trimethoxysilane; epoxysilanes such as triepoxysilane; aminosilanes such as butylaminosilane and epoxy-aminosilane; alkylsilanes such as methylsilane, dimethylsilane, vinylmethyldimethylcyclotrisiloxane, dimethylsilane-oxocyclopentane, cyclohexylsilane, and cyclohexyldisilane; or a silane or a disilane, but it is not limited thereto.

The curable resin layer may have a thickness of 10 μm to 200 μm. For example, the thickness of the curable resin layer may be 20 nm to 200 nm, 35 nm to 180 nm, 50 nm to 150 nm, 50 nm to 130 nm, 60 nm to 120 nm, or 80 nm to 100 nm.

The polyester-based film according to another embodiment may further comprise at least one selected from the group consisting of a hard coating layer and a silicone adhesive layer, if necessary, on at least one side of the polyester-based film.

Process for Preparing a Polyester-Based Film

The process for preparing a polyester-based film according to another embodiment comprises preparing a base layer; and forming a coating layer on at least one side of the base layer, wherein the light passage of the polyester-based film according to the above Relationship 1 is 91% or more, or the total transmittance thereof for light of 380 nm to 780 nm is 92% or more.

The composition and process conditions may be adjusted such that the polyester-based film finally produced by the above process satisfies the characteristics such as light passage, total transmittance, and orientation angle as described above. Specifically, in order for the final polyester-based film to satisfy the characteristics as discussed above, the composition of the polyester-based resin is adjusted, the extrusion temperature, the preheating temperature at the time of stretching, the stretching ratio in each direction, the stretching temperature, the stretching speed, and the like are adjusted, or heat setting and relaxation is carried out after stretching while the heat setting temperature and relaxation rate are adjusted.

First, a base layer is prepared.

Specifically, the step of preparing a base layer may comprise melt-extruding a polyester-based resin to prepare an unstretched sheet; preheating the unstretched sheet at 70°

C. to 90° C.; stretching the unstretched sheet 1 time to 1.5 times in a first direction and stretching it 3 to 5 times in a second direction perpendicular to the first direction at 70° C. to 125° C. to prepare a stretched sheet; and heat setting the stretched sheet at 160° C. to 230° C.

Details on the polyester-based resin are as described above.

Specifically, the polyester-based resin may be melt-extruded at a temperature of 260° C. to 300° C., 270° C. to 290° C., or 275° C. to 285° C., and then cooled to obtain an unstretched sheet.

Thereafter, the unstretched sheet may be preheated at 70° C. to 90° C., 75° C. to 90° C., or 78° C. to 87° C. As the preheating temperature satisfies the above range, it is possible to secure excellent folding characteristics by enhancing the flexibility without deteriorating the light passage and total transmittance and to effectively prevent breakage during the subsequent stretching step.

Thereafter, the unstretched sheet may be stretched 1 time to 1.5 times in a first direction and stretched 3 times to 5 times in a second direction perpendicular to the first direction at 70° C. to 125° C. to prepare a stretched sheet. Here, the stretching may be carried out by passing the unstretched sheet through a roll while it is conveyed. The conveying speed and the discharge rate of the unstretched sheet may be controlled to adjust the base layer to a desired thickness.

Specifically, the stretching may be carried out at 70° C. to 125° C., 75° C. to 120° C., 80° C. to 105° C., 90° C. to 100° C., or 92° C. to 98° C. As the stretching temperature satisfies the above range, it is possible to effectively prevent breakage during the stretching step.

More specifically, the stretching temperature in the first direction may be 75° C. to 100° C. or 85° C. to 98° C., and the stretching temperature in the second direction may be 90° C. to 120° C. or 92° C. to 105° C.

In addition, the stretching speed may be 1 m/minute to 8 m/minute, 1.3 m/minute to 5 m/minute, 1.5 m/minute to 3 m/minute, or 1.5 m/minute to 2 m/minute.

The stretching ratio in the first direction may be 1 time to 1.5 times, 1 time to 1.3 times, 1 time to 1.2 times, or 1.1 times to 1.15 times, and the stretching ratio in the second direction perpendicular to the first direction may be 3 times to 5 times, 3.3 times to 4.8 times, 3.5 times to 4.8 times, 4 times to 4.8 times, or 4.2 times to 4.5 times.

In addition, the ratio of the stretching ratio in the first direction to that in the second direction may be 1:3 to 4.5. For example, the ratio of the stretching ratio in the first direction to that in the second direction may be 1:3 to 4.5, 1:3 to 4.4, or 1:3.1 to 4.3. As the ratio of the stretching ratio in the first direction to that in the second direction satisfies the above range, it is possible to secure excellent folding characteristics by enhancing the flexibility without deteriorating the light passage and total transmittance.

Thereafter, the stretched sheet is heat-set at 160° C. to 230° C. to prepare a polyester-based film.

Specifically, the heat setting may be annealing and carried out at 165° C. to 210° C., 170° C. to 205° C., or 175° C. to 205° C., for 0.5 minute to 8 minutes, 0.5 minute to 5 minutes, 0.5 minute to 3 minutes, or 1 minute to 2 minutes. Upon completion of the heat setting, the temperature may be lowered in stages.

In addition, the above process may further comprise a relaxation step after the step of heat setting.

The relaxation may be carried out in a first direction or in a second direction that is perpendicular to the first direction. Alternatively, the relaxation may be carried out in the first direction as a first relaxation and then in the second direction as a second relaxation.

Specifically, the relaxation may be carried out at a temperature of 60° C. to 180° C., 80° C. to 150° C., 80° C. to 120° C., or 90° C. to 110° C., at a relaxation rate of 5% or less, 4% or less, 3% or less, 0.1% to 5%, 0.5% to 4%, 1% to 3%, or 2% to 3%.

Thereafter, a coating layer is formed on at least one side of the base layer.

Specifically, a composition for a coating layer, which comprises at least one selected from the group consisting of a urethane-based resin, an ester-based resin, and an acrylic-based resin, is coated on at least one side of the base layer and then dried to form a coating layer.

The composition for a coating layer may comprise at least one selected from the group consisting of a urethane-based resin, an ester-based resin, and an acrylic-based resin in an amount of 45% by weight to 65% by weight or 50% by weight to 60% by weight based on the total weight of the composition for a coating layer.

In addition, the drying may be carried out at 90° C. to 140° C., 95° C. to 130° C., 100° C. to 120° C., or 105° C. to 115° C.

According to another embodiment, a curable resin layer may be formed on at least one side of the base layer. Details on the curable resin layer are as described above.

Specifically, a composition for a cured resin layer comprising a photocurable resin or a thermosetting resin is coated on one side of the base layer or one side of the coating layer to form a curable resin layer.

More specifically, the composition for a cured layer may comprise a photocurable resin or a thermosetting resin and may further comprise at least one additive selected from the group consisting of a crosslinking agent, an antistatic agent, and a defoaming agent. Details on the photocurable resin, thermosetting resin, and additive are as described above.

In addition, the coating may be carried out by a roll coating method, a gravure coating method, a spray coating method, or the like, but it is not limited thereto.

The process for preparing a polyester-based film according to another embodiment comprises melt-extruding a polyester-based resin to prepare an unstretched sheet; stretching the unstretched sheet 1 time to 1.5 times in a first direction at 70° C. to 125° C. and stretching it 3 times to 5 times in a second direction perpendicular to the first direction to prepare a stretched film; and heat-setting the stretched film at 160° C. to 230° C. to prepare a polyester-based film, and the polyester-based film satisfies the above Relationship 2 in the first direction within the plane.

First, a polyester-based resin is melt-extruded to form an unstretched sheet.

Details on the polyester-based resin are as described above.

Specifically, the polyester-based resin may be melt-extruded at a temperature of 260° C. to 300° C. or 270° C. to 290° C. and then cooled to obtain an unstretched sheet.

Thereafter, the unstretched sheet is passed through a roll while it is conveyed. In such an event, the conveying speed and the discharge rate of the unstretched sheet may be controlled to adjust the unstretched sheet to a desired thickness.

Thereafter, the unstretched sheet is stretched at 70° C. to 125° C. to form a stretched film.

According to another embodiment, the process may further comprise a step of preheating the unstretched sheet before the stretching step.

The preheating temperature satisfies the range of Tg+5° C. to Tg+50° C. based on the glass transition temperature (Tg) of the polyester-based resin, and it is determined to satisfy the range of 70° C. to 90° C. at the same time. When the preheating temperature satisfies the above range, it may be soft enough to be readily stretched, and it is possible to effectively prevent the phenomenon of breakage during stretching thereof as well.

Meanwhile, the stretching may be carried out at 70° C. to 125° C., 75° C. to 120° C., 80° C. to 110° C., 85° C. to 100° C., or 80° C. to 100° C. If the stretching temperature is outside the above range, breakage may occur.

More specifically, the stretching temperature in the first direction may be 75° C. to 90° C. or 75° C. to 85° C., and the stretching temperature in the second direction may be 80° C. to 110° C. or 80° C. to 120° C. If the stretching temperature is outside the above range, breakage may occur.

The stretching may be carried out at a stretching ratio of 1 time to 1.5 times or 1 time to 1.45 times in the first direction and at a stretching ratio of 3 times to 5 times, 3.3 times to 4.8 times, 3.5 times to 4.8 times, 4 times to 4.8 times, or 4.2 to 4.5 times in the second direction perpendicular to the first direction.

The ratio of the stretching ratio in the first direction to that in the second direction may be 1:1.5 to 5.5. For example, the ratio of the stretching ratio in the first direction to that in the second direction may be 1:2 to 5, 1:2.5 to 4.5, or 1:3.5 to 4.5. As the ratio of the stretching ratio in the first direction to that in the second direction satisfies the above range, it is possible to further enhance the durability and uniformity of curvature.

In addition, a coating step may be further carried out after the stretching. Specifically, a coating step may be further carried out before the stretching in the first direction or before stretching in the second direction after stretching in the first direction. More specifically, a coating step may be further carried out for forming a promoting layer or the like capable of imparting functionality such as antistatic or the like to the film. The coating step may be carried out by spin coating or in-line coating, but it is not limited thereto.

Thereafter, the stretched film is heat-set at 160° C. to 230° C. to prepare a polyester-based film.

Specifically, the heat setting may be annealing and carried out at 165° C. to 210° C., 170° C. to 200° C., 170° C. to 190° C., or 175° C. to 185° C., for 0.5 minute to 8 minutes, 0.5 minute to 5 minutes, 0.5 minute to 3 minutes, or 1 minute to 2 minutes. Upon completion of the heat setting, the temperature may be lowered in stages.

Further, the above process may further comprise a relaxation step after the stretching step.

The relaxation may be carried out in a first direction or in a second direction that is perpendicular to the first direction. Specifically, the relaxation may be carried out at 60° C. to 180° C., 80° C. to 150° C., 80° C. to 120° C., or 90° C. to 110° C., at a relaxation rate of 5% or less. For example, the relaxation rate may be 5% or less, 4% or less, or 3% or less, and 0.1% to 5%, 0.5% to 4%, or 1% to 3%.

Protective Film

The protective film according to another embodiment comprises a polyester-based film; and a curable resin layer disposed on one side of the polyester-based film, wherein the polyester-based film satisfies the above Relationship 2 in a first direction within the plane.

Details on the polyester-based film are as described above.

The protective film according to an embodiment comprises a curable resin layer on one side of the polyester-based film, whereby it has an advantageous effect on shock absorption.

FIG. 10 shows a protective film according to an embodiment. Specifically, FIG. 10 illustrates a protective film (100) composed of a polyester-based film (110) and a curable resin layer (120) disposed on one side of the polyester-based film (110).

Details on the curable resin layer are as described above.

In addition, the protective film may further comprise at least one selected from the group consisting of a hard coating layer, an adhesive layer, and a release layer.

FIG. 11 shows a protective film according to another embodiment. Specifically, FIG. 11 illustrates a protective film (100) comprising a polyester-based film (110), a curable resin layer (120) disposed on one side of the polyester-based film, a hard coating layer (130) disposed on one side of the curable resin layer (120), an adhesive layer (140) disposed on the other side of the polyester-based film (110), and a release layer (150) disposed on one side of the adhesive layer (140).

The hard coating layer may comprise a photocurable resin. As the protective film comprises the hard coating layer, it can enhance the film surface hardness, so that it may have excellent scratch resistance.

Examples of the photocurable resin include compounds having one or two or more unsaturated bonds such as compounds having an acrylate-based functional group. Examples of the compound having one unsaturated bond include ethyl (meth)acrylate, ethylhexyl (meth)acrylate, styrene, methylstyrene, N-vinylpyrrolidone, and the like. Examples of the compound having two unsaturated bonds include polymethylolpropane tri(meth)acrylate, tripropylene glycol di(meth)acrylate, diethylene glycol di(meth)acrylate, pentaerythritol tri(meth)acrylate, pentaerythritol tetra(meth)acrylate, dipentaerythritol hexa(meth)acrylate, dipentaerythritol penta(meth)acrylate, 1,6-hexanediol di(meth)acrylate, neopentyl glycol di(meth)acrylate, and the like. As used herein, "(meth)acrylate" refers to methacrylate and acrylate.

The adhesive layer may comprise an adhesive resin. The adhesive resin may be formed by polymerization of, for example, at least one selected from an acrylic monomer and an unsaturated monomer containing a carboxyl group. Examples of the acrylic monomer include methyl (meth)acrylate, butyl (meth)acrylate, dimethylaminoethyl (meth)acrylate, isobutyl (meth)acrylate, 2-hydroxypropyl (meth)acrylate, glycerol (meth)acrylate, poly (ethylene glycol) methyl ether (meth)acrylate, methoxytripropylene glycol (meth)acrylate, dicyclopentanyl (meth)acrylate, and the like. In addition, examples of the carboxyl group-containing unsaturated monomer include acrylic acid, methacrylic acid, itaconic acid, and maleic acid.

The release layer may be a polyester-based film such as a polyethylene terephthalate film, a polyethylene naphthalate film, a polypropylene terephthalate film, a polybutylene terephthalate film, or a polypropylene naphthalate film, but it is not limited thereto.

Process for Preparing a Protective Film

The process for preparing a protective film according to another embodiment comprises preparing a polyester-based film; and forming a curable resin layer on one side of the polyester-based film, wherein the polyester-based film satisfies the above Relationship 2 in a first direction within the plane.

Details on the polyester-based film and the process for preparing the same are as described above.

Specifically, the step of forming a curable resin layer comprises coating a primer composition on one side of the polyester-based film. Specifically, the primer composition may comprise a photocurable resin or a thermosetting resin and may further comprise at least one additive selected from the group consisting of a crosslinking agent, an antistatic agent, and a defoaming agent. Details on the photocurable resin, thermosetting resin, and additive are as described above.

The coating may be carried out by a roll coating method, a gravure coating method, a spray coating method, or the like, but it is not limited thereto.

Display Device

The display device according to another embodiment comprises a display panel; and a polyester-based film disposed on one side of the display panel, wherein the polyester-based film comprises a base layer and a coating layer on at least one side of the base layer, and the light passage of the polyester-based film according to the above Relationship 1 is 91% or more, or the total transmittance thereof for light of 380 nm to 780 nm is 92% or more.

The display device according to another embodiment comprises a display panel; and a polyester-based film disposed on one side of the display panel, wherein the polyester-based film satisfies the above Relationship 2 in a first direction within the plane.

Details on the polyester-based film are as described above.

Specifically, the polyester-based film can achieve the characteristics required for a protective film of a flexible display device or a foldable display device by adjusting its dimensions depending on the conditions of the preparation process thereof. More specifically, when the polyester-based film is applied to flexible display devices or foldable display devices, whitening or cracks due to delamination hardly occurs even when folded a number of times, while maintaining the durability, transparency, and visibility characteristics.

Hereinafter, the present invention will be described in more detail with reference to the following examples. However, these examples are set forth to illustrate the present invention, and the scope of the present invention is not limited thereto.

Embodiments for Carrying Out the Invention

Hereinafter, the present invention will be described in detail with reference to Examples. But the following examples are intended to illustrate the present invention, and the scope of the present invention is not limited thereto only.

Preparation of a Polyester-Based Film

Example 1-1

(1) Preparation of a Base Layer

A polyethylene terephthalate resin in which ethylene glycol and terephthalic acid had been employed at a molar ratio of 1:1 (manufacturer: SKC) was melt-extruded through an extruder at 280° C. and then cooled on a casting roll at 35° C. to prepare an unstretched sheet.

Thereafter, the unstretched sheet was preheated at 85° C., stretched 1.1 times in the MD direction at 95° C., stretched 4.3 times in the TD direction, and then heat-set at 180° C. for 90 seconds. Here, the stretching speed in the TD direction was about 1.9 m/minute. Thereafter, it was relaxed at 100° C. at a relaxation rate of 2.5% in the TD direction to prepare a base layer having an average thickness of 125 μm.

(2) Preparation of a Film

A coating composition containing 55% by weight of a urethane-based resin was coated onto both sides of the base layer and dried to prepare a polyester-based film having a first coating layer (thickness: 70 nm) and a second coating layer (thickness: 70 nm).

Examples 1-2 to 1-6 and Comparative Examples 1-1 to 1-6

Polyester-based films were prepared in the same manner as in Example 1-1, except that the polyester-based films had a thickness as shown in Table 1 below under the process conditions as shown in Table 1.

TABLE 1

| | Base layer | | | | | Thickness of coating layer (nm) | |
|---|---|---|---|---|---|---|---|
| | Stretching ratio | | Stretching temp. | Heat-setting temp. | Avg. thickness | First coating | Second coating |
| | MD | TD | (° C.) | (° C.) | (μm) | layer | layer |
| Ex. 1-1 | 1.1 | 4.3 | 95 | 180 | 125 | 70 | 70 |
| Ex. 1-2 | 1.1 | 4.3 | 95 | 180 | 81 | 70 | 70 |
| Ex. 1-3 | 1.1 | 4.3 | 95 | 200 | 80 | 70 | 70 |
| Ex. 1-4 | 1.0 | 4.3 | 95 | 180 | 80 | 70 | 70 |
| Ex. 1-5 | 1.3 | 4.3 | 95 | 180 | 55 | 70 | 70 |
| Ex. 1-6 | 1.4 | 4.3 | 95 | 200 | 80 | 70 | 70 |
| C. Ex. 1-1 | 3.2 | 4.2 | 135 | 230 | 50 | 70 | 70 |
| C. Ex. 1-2 | 3.3 | 3.5 | 140 | 180 | 40 | 70 | 70 |
| C. Ex. 1-3 | 3.2 | 3.8 | 140 | 240 | 75 | 70 | 70 |
| C. Ex. 1-4 | 3.3 | 3.54 | 140 | 185 | 50 | 70 | 70 |
| C. Ex. 1-5 | 1.0 | 4.3 | 95 | 180 | 80 | 40 | 40 |
| C. Ex. 1-6 | 1.0 | 4.3 | 95 | 180 | 80 | 110 | 110 |

Test Example

Test Example 1-1: Thickness Deviation

The polyester-based films prepared in Examples 1-1 to 1-6 and Comparative Examples 1-1 to 1-6 were measured for the thickness at an interval of 5 cm in the transverse direction using an electric micrometer (trade name: Militron 1245D, manufacturer: Fineryuf). The thickness deviation was calculated according to the following Equation A.

Thickness deviation (μm)=maximum thickness in the transverse direction (μm)−minimum in the transverse direction (μm) [Equation A]

Test Example 1-2: In-Plane Retardation and Thickness Direction Retardation

The polyester-based films prepared in Examples 1-1 to 1-6 and Comparative Examples 1-1 to 1-6 were measured for the in-plane retardation and thickness direction retardation.

Specifically, the polyester-based films were measured for the refractive indices (Nx, Ny) of two mutually perpendicular axes and the thickness direction refractive index using a refractometer (RETS-100, measuring wavelength 550 nm) of Otsuka at 25° C. The thickness d (nm) of the film was measured using an electric micrometer (trade name: Militron 1245D, manufacturer: Fineryuf), which was converted to a unit of nm.

According to the following Equations B and C, the in-plane retardation (Re) was calculated by multiplying the measured $\Delta Nxy$ (=|Nx−Ny|) by the film thickness d (nm), and the thickness direction retardation (Rth) was calculated as an average of the values obtained by multiplying the measured $\Delta Nxz$ (=|Nx−Nz|) and $\Delta Nyz$ (=|Ny−Nz|) by the film thickness d (nm), respectively.

$$Re = \Delta Nxy \times d \quad \text{[Equation B]}$$

$$Rth = \frac{(\Delta Nxz + \Delta Nyz)}{2} \times d \quad \text{[Equation C]}$$

Test Example 1-3: Orientation Angle, Deviation of Orientation Angle, and Rate of Change in Orientation Angle The polyester-based films prepared in Examples 1-1 to 1-6 and Comparative Examples 1-1 to 1-6 were measured for the orientation angle for the entire width using a refractometer (RETS-100, measuring wavelength 550 nm) of Otsuka.

In addition, in the measurement results, the average value of the orientation angles was measured within a range of ±2,000 mm in the transverse direction from the central axis of the film, and the deviation of the orientation angle was calculated accordingly.

In addition, the polyester-based films of Examples 1-1, 1-3, and 1-5 and Comparative Example 1-4 were cut at an interval of 10 cm or 30 cm in the transverse direction (TD), which were measured for the orientation angle, and the rate of change in the orientation angle was calculated accordingly.

FIGS. 1 to 4 each show the measurement results of the orientation angle in the transverse direction of the polyester-based films of Examples 1-1, 1-3, and 1-5 and Comparative Example 1-4.

Test Example 1-4: Light Passage

The polyester-based films prepared in Examples 1-1 to 1-6 and Comparative Examples 1-1 to 1-6 were measured for the light passage using a TES digital illuminometer (trade name: TES-1334A, manufacturer: TES).

Specifically, as shown in FIG. 5, a light-emitting apparatus (10) was positioned at the lower position, and a first polarizing plate (21) and a second polarizing plate (22) were placed in parallel at a distance from each other over the light-emitting apparatus. Here, the distance between the light-emitting apparatus (10) and the first polarizing plate (21) was about 2.5 cm, and the distance between the light-emitting apparatus (10) and the second polarizing plate (22) was about 20 cm.

Before and after the polyester-based film was interposed between the first polarizing plate and the second polarizing plate, light of 530 nm was supplied (a: light direction) at 12 V and transmitted using the light-emitting apparatus (10) to measure each luminance (lux), and the light passage was calculated according to the following Relationship 1.

$$\text{Light passage} = \frac{B}{A} \times 100 \quad \text{[Relationship 1]}$$

In Relationship 1, A is the luminance (lux) when light of 530 nm is transmitted through two parallel polarizing plates, and B is the luminance (lux) when light of 530 nm is transmitted after the polyester-based film is placed between the two polarizing plates, wherein the transverse direction (TD) of the polyester-based film is positioned at an angle of 45° to the optical axis (b) of the two polarizing plates.

In addition, the ratio of the light passage to the orientation angle measured in Test Examples 1-4 was calculated.

Test Example 1-5: Total Transmittance

The polyester-based films prepared in Examples 1-1 to 1-6 and Comparative Examples 1-1 to 1-6 were measured for the total transmittance using a haze meter (Gardner BYK) in accordance with ASTM D1003.

Test Example 1-6: Moisture Permeability

The polyester-based films prepared in Examples 1-1 to 1-6 and Comparative Examples 1-1 to 1-6 were measured for the moisture permeability (g/m$^2$·day) using a moisture permeability tester (trade name: PERMATRAN_W, manufacturer: Mocon) in accordance with ISO2528 (1995).

Test Example 1-7: Impact Strength

A mobile device to which the polyester-based films prepared in Examples 1-1 to 1-6 and Comparative Examples 1-1 to 1-6 had been each attached as a protective film was dropped 10 times from 80 cm. The degree of damage caused by the impact to the liquid crystal was evaluated according to the following criteria.
⊚: Not damaged for all 10 times.
○: Not damaged for 7 to 9 times.
Δ: Not damaged for 1 to 6 times.
x: Damaged for all 10 times.

Test Example 1-8: Folding Characteristics

The polyester-based films prepared in Examples 1-1 to 1-6 and Comparative Examples 1-1 to 1-6 were subjected to the MIT folding test in accordance with ASTM D 2176 and TAPPI T 511 using a folding endurance tester (trade name: MIT-DA, manufacturer: Toyoseiki).

Specifically, in the folding test, ultra-thin glass was laminated on the upper and lower sides of the film with an optically transparent adhesive (OCA) to prepare a laminate, and the laminate was repeatedly folded 15,000 times in the MD direction, TD direction, and 45° direction to the TD direction at a radius of curvature of 1.5 mm. The presence or absence of delamination between the layers was observed.
- ○: delamination between the layers.
- x: no delamination between the layers.

Test Example 1-9: Rainbow

One side of each of the polyester-based films prepared in Examples 1-1 to 1-6 and Comparative Examples 1-1 to 1-6 was blackened, and the visibility of the rainbow phenomenon was evaluated with the naked eyes at a polar angle. Here, it was evaluated under a three-wavelength lamp in a dark room according to the following criteria.
- 0: no rainbow phenomenon with a uniform color.
- 1: slight rainbow phenomenon with a uniform color.
- 2: slight rainbow phenomenon with a non-uniform color.
- 3: strong rainbow phenomenon with a strong color.

TABLE 2

|  | Refractive index difference ($\|Nx - Ny\|$) | Thickness deviation (µm) | Re (nm) | Rth (nm) | Moisture permeability (g/m²·day) | Impact strength |
|---|---|---|---|---|---|---|
| Ex. 1-1 | 0.092 | 1.6 | 11,500 | 12,500 | 5.0 | ⊚ |
| Ex. 1-2 | 0.103 | 1.5 | 8,370 | 9,200 | 8.6 | ○ |
| Ex. 1-3 | 0.106 | 1.6 | 8,490 | 9,500 | 8.8 | ○ |
| Ex. 1-4 | 0.121 | 1.2 | 9,660 | 9,650 | 8.7 | ○ |
| Ex. 1-5 | 0.110 | 0.6 | 6,050 | 8,520 | 9.8 | ○ |
| Ex. 1-6 | 0.086 | 2.9 | 6,900 | 11,400 | 8.8 | ○ |
| C. Ex. 1-1 | 0.038 | 1.5 | 1,908 | 10,294 | 17.8 | X |
| C. Ex. 1-2 | 0.002 | 2.0 | <100 | 8,752 | 15.0 | ○ |
| C. Ex. 1-3 | 0.048 | 2.5 | 3,600 | 10,940 | 11.0 | Δ |
| C. Ex. 1-4 | 0.016 | 1.5 | <800 | <800 | 13.8 | Δ |
| C. Ex. 1-5 | 0.108 | 1.2 | 9,650 | 9,680 | 8.6 | ○ |
| C. Ex. 1-6 | 0.108 | 1.2 | 9,670 | 9,650 | 8.6 | ○ |

TABLE 3

|  | Orientation angle (°) | Light passage (%) | Orientation angle:light passage | Total transmittance (%) |
|---|---|---|---|---|
| Ex. 1-1 | 1.1 | 92.8 | 1:84.3 | 92.8 |
| Ex. 1-2 | 1.1 | 92.3 | 1:83.9 | 92.9 |
| Ex. 1-3 | 1.1 | 92.6 | 1:84.2 | 92.6 |
| Ex. 1-4 | 0.7 | 91.9 | 1:131.3 | 92.8 |
| Ex. 1-5 | 0.6 | 91.0 | 1:151.7 | 92.7 |
| Ex. 1-6 | 1.5 | 91.4 | 1:60.9 | 92.9 |
| C. Ex. 1-1 | 17.8 | 89.0 | 1:5 | 92.5 |
| C. Ex. 1-2 | 25.2 | 87.0 | 1:3.4 | 92.5 |
| C. Ex. 1-3 | 21.9 | 91.0 | 1:4.2 | 92.4 |
| C. Ex. 1-4 | 25.6 | 85.0 | 1:3.3 | 92.7 |
| C. Ex. 1-5 | 0.7 | 90.5 | 1:129.3 | 91.4 |
| C. Ex. 1-6 | 0.8 | 90.8 | 1:113.5 | 91.5 |

TABLE 4

|  | Layer delamination | | | Rainbow |
|---|---|---|---|---|
|  | MD | TD | 45° | |
| Ex. 1-1 | x | x | x | 0 |
| Ex. 1-2 | x | x | x | 0 |
| Ex. 1-3 | x | x | x | 0 |
| Ex. 1-4 | x | x | x | 0 |
| Ex. 1-5 | x | x | x | 1 |
| Ex. 1-6 | x | x | x | 1 |
| C. Ex. 1-1 | x | x | x | 3 |
| C. Ex. 1-2 | x | x | x | 2 |
| C. Ex. 1-3 | ○ | ○ | ○ | 3 |
| C. Ex. 1-4 | x | x | x | 2 |
| C. Ex. 1-5 | x | x | x | 0 |
| C. Ex. 1-6 | x | x | x | 0 |

TABLE 5

|  | Deviation of orientation angle | Rate of change in orientation angle |
|---|---|---|
| Ex. 1-1 | 0.57° | 0.16°/10 cm |
| Ex. 1-3 | 0.62° | 0.15°/10 cm |
| Ex. 1-5 | 0.34° | 0.13°/30 cm |
| C. Ex. 1-4 | 10.42° | 2.06°/30 cm |

As shown in Tables 2 to 5 above, the polyester-based films of Examples 1-1 to 1-6 had excellent durability, reliability, and visibility as compared with the polyester-based films of Comparative Examples 1-1 to 1-6.

Specifically, the polyester-based films of Examples 1-1 to 1-6 had excellent optical properties, particularly, excellent light passage and total transmittance, had a low thickness deviation, and had an orientation angle satisfying the preferred range, resulting in excellent visibility.

In particular, as shown in FIGS. 1 to 3 showing the orientation angle measurement results along the transverse direction of the polyester-based films of Examples 1-1, 1-3, and 1-5, the films of Examples 1-1, 1-3, and 1-5 had a very low deviation of orientation angle and rate of change in orientation angle with respect to the film thickness, and had excellent total transmittance, folding characteristics, and visibility of rainbow as well. Thus, their visibility and reliability were very excellent.

In addition, as the polyester-based films of Examples 1-1 to 1-6 showed preferable results in terms of the in-plane retardation, thickness direction retardation, moisture permeability, and impact strength, they were excellent in durability and dimensional stability. Accordingly, when the polyester-based films of Examples 1-1 to 1-6 are each applied as a protective film for display devices such as smartphones, their optical properties and durability would be excellent, as well as their visibility and fingerprint recognition rate can be enhanced.

In contrast, the films of Comparative Examples 1-1 to 1-6 had a high orientation angle or low light passage and total transmittance, resulting in poor visibility. In particular, as shown in FIG. 4 showing the orientation angle measurement results along the transverse direction of the polyester-based film of Comparative Example 1-4, the film of Comparative Example 1-4 had a very high deviation of orientation angle and rate of change in orientation angle with respect to the film thickness, and had poor total transmittance, folding characteristics, and visibility of rainbow as well. Thus, their visibility and reliability were very poor.

In addition, although the films of Comparative Examples 1-5 and 1-6 had a level similar to that of Example 1-4 in terms of the orientation angle, moisture permeability, and impact strength, the thickness of the coating layer was outside the preferred range, so that the deviation of orientation angle, rate of change in orientation angle, light passage, and optical properties such as total transmittance were deteriorated.

EXAMPLE

Preparation of a Polyester-Based Film

Example 2-1

A polyethylene terephthalate resin in which ethylene glycol and terephthalic acid had been employed at a molar ratio of 1:1 (manufacturer: SKC) was melt-extruded through an extruder at 280° C. and then cooled on a casting roll at 35° C. to prepare an unstretched sheet.

Thereafter, the unstretched sheet was stretched 1.1 times in the MD direction at 95° C., stretched 4.3 times in the TD direction, and then heat-set at 180° C. for 90 seconds. Thereafter, it was relaxed at 130° C. at a relaxation rate of 2% in the TD direction to prepare a polyester-based film having a thickness of 125 μm.

Example 2-2

A polyethylene terephthalate resin in which ethylene glycol and terephthalic acid had been employed at a molar ratio of 1:1 (manufacturer: SKC) was melt-extruded through an extruder at 280° C. and then cooled on a casting roll at 35° C. to prepare an unstretched sheet.

Thereafter, the unstretched sheet was stretched 1.1 times in the MD direction at 95° C., stretched 4.3 times in the TD direction, and then heat-set at 200° C. for 90 seconds. Thereafter, it was relaxed at 130° C. at a relaxation rate of 2% in the TD direction to prepare a polyester-based film having a thickness of 80 μm.

Comparative Example 2-1

A polyethylene terephthalate resin in which ethylene glycol and terephthalic acid had been employed at a molar ratio of 1:1 (manufacturer: SKC) was melt-extruded through an extruder at 280° C. and then cooled on a casting roll at 35° C. to prepare an unstretched sheet.

Thereafter, the unstretched sheet was stretched 1.1 times in the MD direction at 135° C., stretched 4.3 times in the TD direction, and then heat-set at 230° C. for 90 seconds. Thereafter, it was relaxed at 130° C. at a relaxation rate of 2% in the TD direction to prepare a polyester-based film having a thickness of 50 μm.

Test Example

Test Example 2-1: Tensile Rate

The polyester-based films of Examples 2-1 and 2-2 and Comparative Examples 2-1 were measured for the tensile rate using a tensile strength meter (UTM) under the following conditions.

Specimen length: 50 mm
Specimen width: 10 mm
Specimen thickness: 50 μm
Measurement temperature: room temperature
Tensile speed: 50 mm/minute
Tensile direction: transverse direction (TD), longitudinal direction (MD), and 45° direction (1) Measurement of the Load by Initial Tensile Rate First, the specimens of the polyester-based films of Examples 2-1 and 2-2 and Comparative Examples 2-1 were measured for the respective loads ($N_{1\%}$ and $N_{2\%}$) for tensile of 1% or 2% relative to the initial dimension in the three tensile directions.

FIG. 12 shows a curve of tensile rate (%) with respect to load (N) applied to the polyester-based film of Example 2-1 in the longitudinal direction (MD). FIG. 13 shows a curve of tensile rate (%) with respect to load (N) applied to a polyester-based film in the 45° direction. The loads of $N_{1\%}$ and $N_{2\%}$ were determined from the tensile rate curve with respect to the load, respectively.

(2) Measurement of the Final Tensile Rate at a Sustained Load

Thereafter, the respective loads measured above were applied to the specimen for 20 minutes in the three directions, respectively. Then, $S_1$ to $S_6$ as the final tensile rate (%) relative to the initial dimensions of the specimen was measured.

Specifically, $S_1$ is the final tensile rate (%) after $N_{1\%}$ is maintained for 20 minutes in the MD direction, $S_2$ is the final tensile rate (%) after $N_{2\%}$ is maintained for 20 minutes in the MD direction, $S_3$ is the final tensile rate (%) after $N_{1\%}$ is maintained for 20 minutes in the TD direction, $S_4$ is the final tensile rate (%) after $N_{2\%}$ is maintained for 20 minutes in the TD direction, $S_5$ is the final tensile rate (%) after $N_{1\%}$ is maintained for 20 minutes in the 45° direction, and $S_6$ is the final tensile rate (%) after $N_{2\%}$ is maintained for 20 minutes in the 45° direction.

FIG. 14 shows curves of tensile rate (%) with respect to time (s) under a certain load applied to the polyester-based films of Example 2-1 and Comparative Example 2-1 in the longitudinal direction (MD).

FIG. 15 shows curves of tensile rate (%) with respect to time (s) under a certain load applied to the polyester-based films of Example 2-1 and Comparative Example 2-1 in the transverse direction (TD).

FIG. 16 shows curves of tensile rate (%) with respect to time (s) under a certain load applied to the polyester-based films of Example 2-1 and Comparative Example 2-1 in the 45° direction.

(3) Relationship 2 to 4

Relationship 2 to 4 were calculated according to the final tensile rate obtained in Section (2) above.

$$0.5 \leq |S_1 - S_2| \leq 3.1 \quad \text{[Relationship 2]}$$

$$0.5 \leq |S_3 - S_4| \leq 5.2 \quad \text{[Relationship 3]}$$

$$0.5 \leq |S_5 - S_6| \leq 7.2 \quad \text{[Relationship 4]}$$

Test Example 2-2: Folding Test

The specimens of the polyester-based films of Examples 2-1 and 2-2 and Comparative Example 2-1 were subjected to the MIT folding test in accordance with ASTM D 2176 and TAPPI T 511 using a folding endurance tester (trade name: MIT-DA, manufacturer: Toyoseiki).

Specifically, in the folding test, ultra-thin glass was laminated on the upper and lower sides of the film specimen with an optically transparent adhesive (OCA) to prepare a laminate, and the laminate was repeatedly folded 15,000 times at a radius of curvature of 1.5 mm. The presence or absence of delamination between the layers was observed.
o: delamination between the layers.
x: no delamination between the layers.

Test Example 2-3: Evaluation of Dent Marks

The specimens of the polyester-based films of Examples 2-1 and 2-2 and Comparative Example 2-1 were each wound around a core in the form of a roll. After one week, it was checked whether or not dot-shaped dent marks had been generated on the surface of the film specimen during unwinding.
o: dent marks.
x: no dent marks.

marks on the film surface upon repeated folding of 15,000 times. Thus, they had poor flexibility and appearance characteristics.

Test Example 2-4: Thickness Deviation

The polyester-based films prepared in Examples 2-1 and 2-2 and Comparative Example 2-1 were measured for the thickness using a refractometer (RETS-100, measuring wavelength 550 nm) of Otsuka. The thickness deviation was calculated accordingly.

Test Example 2-5: In-Plane Retardation and Thickness Direction Retardation

The polyester-based films prepared in Examples 2-1 and 2-2 and Comparative Example 2-1 were measured for the in-plane retardation and thickness direction retardation.

Specifically, the polyester-based films were measured for the refractive indices (Nx, Ny) of two mutually perpendicular axes and the thickness direction refractive index using a refractometer (RETS-100, measuring wavelength 550 nm) of Otsuka. The thickness d (nm) of the film was measured using an electric micrometer (trade name: Militron 1245D, manufacturer: Fineryuf), which was converted to a unit of nm.

TABLE 6

| | | Initial tensile rate (%) | Tensile rate after 20 minutes (%) | | | [Relationship 2] | [Relationship 3] | [Relationship 4] |
|---|---|---|---|---|---|---|---|---|
| | | | MD | TD | 45° | | | |
| Ex. 2-1 | Ex. 2-1A | 1 | 1.00 | 2.00 | 1.00 | 1.62 | 3.18 | 1.58 |
| | Ex. 2-1B | 2 | 2.62 | 5.18 | 2.58 | | | |
| Ex. 2-2 | Ex. 2-2A | 1 | 1.00 | 2.00 | 1.00 | 1.30 | 2.18 | 1.48 |
| | Ex. 2-2B | 2 | 2.30 | 4.18 | 2.48 | | | |
| C. Ex. 2-1 | C. Ex 2-1A | 1 | 1.56 | 2.42 | 5.54 | 3.20 | 5.28 | 7.24 |
| | C. Ex. 2-1B | 2 | 4.76 | 7.70 | 12.78 | | | |

TABLE 7

| | | Layer delamination | Dent mark |
|---|---|---|---|
| Ex. 2-1 | TD | x | x |
| | MD | x | x |
| | 45° | x | x |
| Ex. 2-2 | TD | x | x |
| | MD | x | x |
| | 45° | x | x |
| C. Ex. 2-1 | TD | o | o |
| | MD | o | x |
| | 45° | o | o |

As shown in Tables 6 and 7 above and FIGS. 14 to 16, the polyester-based films of Examples 2-1 and 2-2 satisfied Relationships 2 to 4 while having low strain rates with respect to tensile load in each direction. This, they had excellent flexibility. In addition, the polyester-based films of Examples 2-1 and 2-2 had neither delamination nor dent marks on the film surface even upon repeated folding of 15,000 times. Thus, they had high flexibility and excellent appearance characteristics at the same time.

In contrast, the polyester-based film of Comparative Example 2-1 had a high strain rate with respect to tensile load in each direction. In addition, the polyester-based film of Comparative Example 2-1 had delamination and dent According to the following Equations B and C, the in-plane retardation (Re) was calculated by multiplying the measured $\Delta Nxy$ ($=|Nx-Ny|$) by the film thickness d (nm), and the thickness direction retardation (Rth) was calculated as an average of the values obtained by multiplying the measured $\Delta Nxz$ ($=|Nx-Nz|$) and $\Delta Nyz$ ($=|Ny-Nz|$) by the film thickness d (nm), respectively.

$$Re = \Delta Nxy \times d \qquad \text{[Equation B]}$$

$$Rth = \frac{(\Delta Nxz + \Delta Nyz)}{2} \times d \qquad \text{[Equation C]}$$

Test Example 2-6: Light Passage

The polyester-based films of Examples 2-1 and 2-2 and Comparative Example 2-1 were measured for the light passage using a digital illuminometer (334A) of TES.

Test Example 2-7: Light Transmittance

The polyester-based films of Examples 2-1 and 2-2 and Comparative Examples 2-1 were measured for the light transmittance using a spectrophotometer (UV2600, measuring wavelength: 380 nm) of Shimatsu.

Test Example 2-8: Moisture Permeability

The polyester-based films of Examples 2-1 and 2-2 and Comparative Examples 2-1 were measured for the moisture permeability using a moisture permeability tester (PERMATRAN_W) of Mo con.

Test Example 2-9: Impact Strength

A mobile device to which the polyester-based films of Examples 2-1 and 2-2 and Comparative Examples 2-1 had been each attached as a protective film was dropped 10 times from 80 cm. The degree of damage caused by impact to the liquid crystal was evaluated.

⊚: Not damaged for all 10 times.
○: Not damaged for 7 to 9 times.
Δ: Not damaged for 1 to 6 times.
x: Damaged for all 10 times.

TABLE 8

| | Thickness deviation (μm) | Ro (nm) | Rth (nm) | Light passage (%) | Light transmittance (%, 380 nm) | Moisture permeability (g/m²·day) | Impact strength |
|---|---|---|---|---|---|---|---|
| Ex. 2-1 | 1.6 | 11,500 | 12,500 | 92.8 | 87.8 | 8.2 | ⊚ |
| Ex. 2-2 | 1.2 | 8,300 | 8,300 | 91.9 | 86.9 | 8.3 | ⊚ |
| C. Ex. 2-1 | 1.5 | 1,908 | 10,294 | 89.0 | 1.8 | 17.8 | X |

As shown in Table 8, the polyester-based films of Examples 2-1 and 2-2 had excellent durability and transparency as compared with the polyester-based film of Comparative Example 2-1.

Specifically, the polyester-based films of Examples 2-1 and 2-2 had thickness deviation, retardation, light passage, light transmittance, and moisture permeability satisfying the preferred ranges and had excellent impact strength, resulting in excellent durability and transparency.

The invention claimed is:

1. A polyester-based film, which satisfies the following Relationship 2 in a first direction in the plane and the following Relationship 3 in a second direction that is perpendicular to the first direction:

$$1.3 \leq |S_1 - S_2| \leq 3.1$$ [Relationship 2]

$$2.18 \leq |S3 - S4| \leq 5.2,$$ [Relationship 3]

wherein in Relationship 2, $S_1$ is the final tensile rate (%) after $N_{1\%}$ is maintained for 20 minutes, and S2 is the final tensile rate (%) after $N_{2\%}$ is maintained for 20 minutes, wherein $N_{1\%}$ is the load that stretches the polyester-based film by 1% in the first direction, and $N_{2\%}$ is the load that stretches the polyester-based film by 2% in the first direction, wherein in Relationship 3, S3 is the final tensile rate (%) after a load that stretches the polyester-based film by 1% in the second direction is maintained for 20 minutes, and S4 is the final tensile rate (%) after a load that stretches the polyester-based film by 2% in the second direction is maintained for 20 minutes, and wherein the polyester-based film comprises a polyethylene terephthalate resin in an amount of 85% by weight or more.

2. The polyester-based film of claim 1, which satisfies the following Relationship 4 in a third direction that is 45° to the first direction:

$$0.5 \leq |S_5 - S_6| \leq 7.2$$ [Relationship 4]

in Relationship 4, $S_5$ is the final tensile rate (%) after a load that stretches the polyester-based film by 1% in the third direction is maintained for 20 minutes, and $S_6$ is the final tensile rate (%) after a load that stretches the polyester-based film by 2% in the third direction is maintained to 20 minutes.

3. The polyester-based film of claim 1, wherein $S_1$ is 0.1 to 2.5, $S_2$ is 1.5 to 4.5, $S_3$ is 0.8 to 2.4, and $S_4$ is 2.3 to 7.5.

4. The polyester-based film of claim 1, wherein $S_1:S_3$ is 0.4 to 0.7:1, and $S_2:S_4$ is 0.4 to 0.7:1.

5. The polyester-based film of claim 1, wherein $N_{1\%}$ in the first direction is 10 N to 25 N, $N_{2\%}$ in the first direction is 28 N to 50 N, the load that stretches the polyester-based film by 1% in the second direction is 25 N to 45 N, and the load that stretches the polyester-based film by 2% in the second direction is 50 N to 70 N.

6. A protective film, which comprises a polyester-based film of claim 1; and a curable resin layer disposed on one side of the polyester-based film.

* * * * *

UNITED STATES PATENT AND TRADEMARK OFFICE
CERTIFICATE OF CORRECTION

PATENT NO. : 11,642,825 B2
APPLICATION NO. : 17/544588
DATED : May 9, 2023
INVENTOR(S) : A Rim Yu et al.

Page 1 of 1

It is certified that error appears in the above-identified patent and that said Letters Patent is hereby corrected as shown below:

On the Title Page

Item (73) Assignee:
Change [[SKC CO., LTD.]] to --SK MICROWORKS CO., LTD.--.

Signed and Sealed this
Tenth Day of October, 2023

Katherine Kelly Vidal
*Director of the United States Patent and Trademark Office*